(12) United States Patent
Walton

(10) Patent No.: US 9,646,090 B2
(45) Date of Patent: May 9, 2017

(54) INTERNET SEARCH ENGINE BASED ON LOCATION AND PUBLIC OPINION

(71) Applicant: INQUESTOR INC., Sarnia (CA)

(72) Inventor: Adam Walton, Sarnia (CA)

(73) Assignee: INQUESTOR INC., Sarnia, Ontario (CA)

( * ) Notice: Subject to any disclaimer, the term of this patent is extended or adjusted under 35 U.S.C. 154(b) by 585 days.

(21) Appl. No.: 14/065,524

(22) Filed: Oct. 29, 2013

(65) Prior Publication Data

US 2014/0122457 A1    May 1, 2014

Related U.S. Application Data

(60) Provisional application No. 61/719,678, filed on Oct. 29, 2012.

(51) Int. Cl.
*G06F 17/30* (2006.01)

(52) U.S. Cl.
CPC .............................. *G06F 17/30864* (2013.01)

(58) Field of Classification Search
CPC ......... G06F 17/30867; G06F 17/30864; G06F 17/3053; G06F 3/0482; G06F 17/30991; G06F 17/30696; G06F 17/30554; G06F 3/04847; G06F 17/30648

USPC ........................................................ 707/706
See application file for complete search history.

(56) References Cited

U.S. PATENT DOCUMENTS

| | | | |
|---|---|---|---|
| 7,599,938 B1 | 10/2009 | Harrison, Jr. | |
| 7,703,030 B2 | 4/2010 | Smirin et al. | |
| 7,801,885 B1* | 9/2010 | Verma | G06F 17/30867 707/713 |
| 7,809,709 B1 | 10/2010 | Harrison, Jr. | |
| 8,200,694 B1* | 6/2012 | Diligenti | G06F 17/3087 707/769 |
| 2005/0091202 A1 | 4/2005 | Thomas | |
| 2008/0114739 A1 | 5/2008 | Hayes | |
| 2008/0250105 A1 | 10/2008 | Grois | |
| 2008/0307053 A1* | 12/2008 | Mitnick | G06F 17/30241 709/205 |
| 2009/0164446 A1* | 6/2009 | Holt | G06F 17/30864 |
| 2011/0145219 A1* | 6/2011 | Cierniak | G06F 17/30867 707/709 |
| 2011/0219300 A1* | 9/2011 | Jindal | G06F 17/30867 715/273 |
| 2012/0233154 A1* | 9/2012 | Walther | G06F 17/30696 707/722 |

* cited by examiner

*Primary Examiner* — Evan Aspinwall

(57) ABSTRACT

A search engine that collects and uses public opinion and geographic location to refine search results. Feedback from users on results from previous searches is collected and used to rank the results of future searches and increase their relevancy to the user.

14 Claims, 31 Drawing Sheets

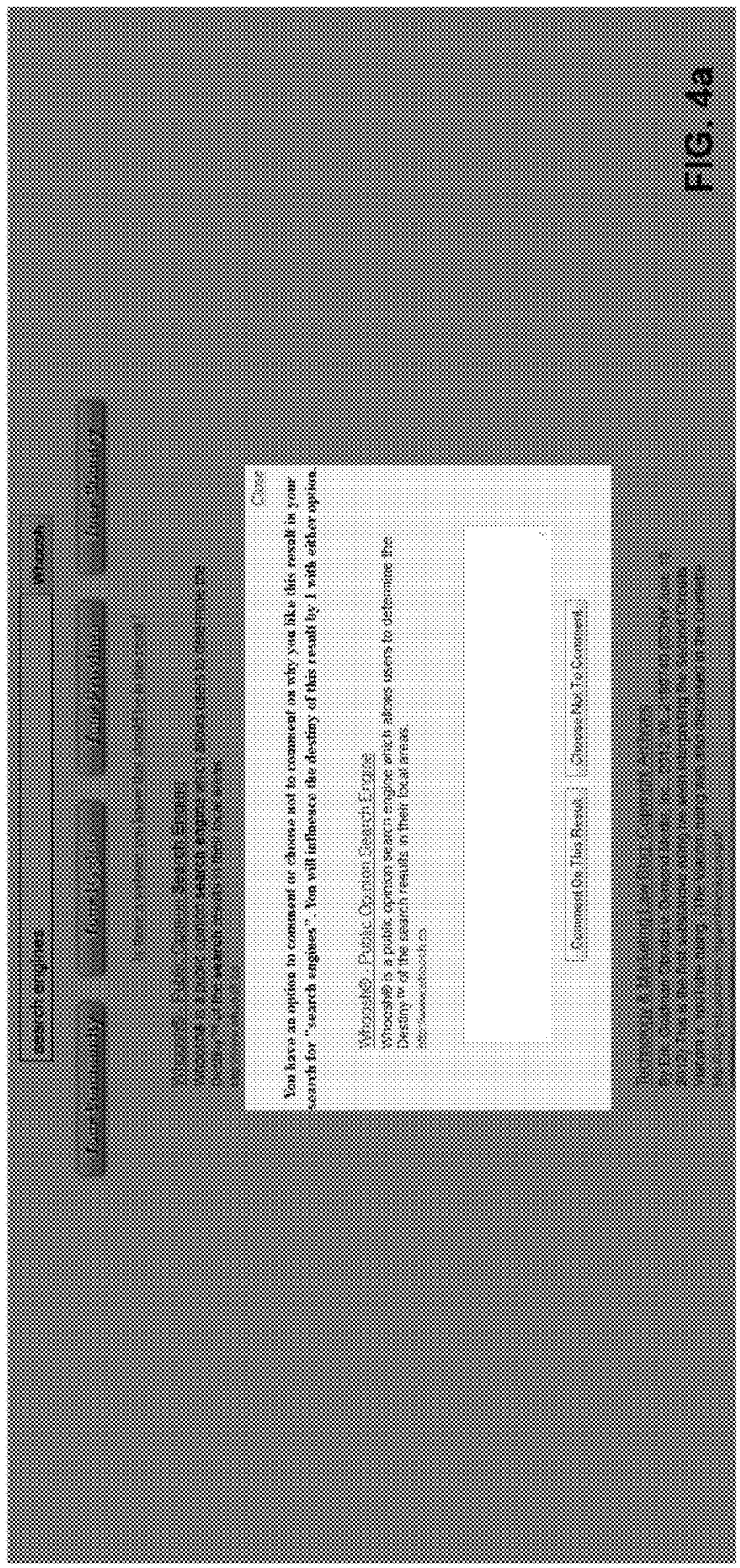

| # | Column | Type | Collation | Attributes | Null | Default | Extra | Action |
|---|---|---|---|---|---|---|---|---|
| 1 | id | int(11) | | | No | None | AUTO_INCREMENT | Change ● Drop More ▶ |
| 2 | positive | decimal(5,2) | | | No | None | | Change ● Drop More ▶ |
| 3 | negative | decimal(5,2) | | | No | None | | Change ● Drop More ▶ |
| 4 | value | decimal(5,2) | | | No | None | | Change ● Drop More ▶ |
| 5 | state | varchar(255) | latin1_swedish_ci | | No | None | | Change ● Drop More ▶ |
| 6 | country | varchar(255) | latin1_swedish_ci | | No | None | | Change ● Drop More ▶ |
| 7 | query_id | int(255) | | | No | None | | Change ● Drop More ▶ |
| 8 | link_id | int(255) | | | No | None | | Change ● Drop More ▶ |
| 9 | unique_id | int(255) | | | No | None | | Change ● Drop More ▶ |
| 10 | url | varchar(255) | latin1_swedish_ci | | No | None | | Change ● Drop More ▶ |
| 11 | title | varchar(255) | latin1_swedish_ci | | No | None | | Change ● Drop More ▶ |
| 12 | description | mediumtext | latin1_swedish_ci | | No | None | | Change ● Drop More ▶ |
| 13 | size | int(11) | | | No | None | | Change ● Drop More ▶ |

FIG. 9d

| # | Column | Type | Collation | Attributes | Null | Default | Extra | Action |
|---|---|---|---|---|---|---|---|---|
| 1 | id | int(11) | | | No | None | AUTO_INCREMENT | Change ● Drop More ▶ |
| 2 | country | varchar(255) | latin1_swedish_ci | | No | None | | Change ● Drop More ▶ |
| 3 | positive | decimal(5,2) | | | No | None | | Change ● Drop More ▶ |
| 4 | negative | decimal(5,2) | | | No | None | | Change ● Drop More ▶ |
| 5 | value | decimal(5,2) | | | No | None | | Change ● Drop More ▶ |
| 6 | query_id | int(99) | | | No | None | | Change ● Drop More ▶ |
| 7 | link_id | int(99) | | | No | None | | Change ● Drop More ▶ |
| 8 | unique_id | int(99) | | | No | None | | Change ● Drop More ▶ |
| 9 | url | varchar(255) | latin1_swedish_ci | | No | None | | Change ● Drop More ▶ |
| 10 | title | varchar(255) | latin1_swedish_ci | | No | None | | Change ● Drop More ▶ |
| 11 | description | mediumtext | latin1_swedish_ci | | No | None | | Change ● Drop More ▶ |
| 12 | size | varchar(11) | latin1_swedish_ci | | No | None | | Change ● Drop More ▶ |

| Table | Action | | | | | | | Rows | Type | Collation | Size | Overhead |
|---|---|---|---|---|---|---|---|---|---|---|---|---|
| comments | Browse | Structure | Search | Insert | Empty | Drop | | 0 | MyISAM | latin1_swedish_ci | 1.0 KiB | |
| community | Browse | Structure | Search | Insert | Empty | Drop | | 0 | MyISAM | latin1_swedish_ci | 1.0 KiB | |
| country | Browse | Structure | Search | Insert | Empty | Drop | | 0 | MyISAM | latin1_swedish_ci | 1.0 KiB | |
| guests | Browse | Structure | Search | Insert | Empty | Drop | | 0 | MyISAM | latin1_swedish_ci | 1.0 KiB | |
| members | Browse | Structure | Search | Insert | Empty | Drop | | 0 | MyISAM | latin1_swedish_ci | 1.0 KiB | |
| province | Browse | Structure | Search | Insert | Empty | Drop | | 0 | MyISAM | latin1_swedish_ci | 1.0 KiB | |
| public_opinion_log | Browse | Structure | Search | Insert | Empty | Drop | | 0 | MyISAM | latin1_swedish_ci | 1.0 KiB | |
| public_opinion_moderation | Browse | Structure | Search | Insert | Empty | Drop | | 0 | MyISAM | latin1_swedish_ci | 1.0 KiB | |
| query_log | Browse | Structure | Search | Insert | Empty | Drop | | 0 | MyISAM | latin1_bin | 1.0 KiB | |
| recommended_results | Browse | Structure | Search | Insert | Empty | Drop | | 0 | MyISAM | latin1_swedish_ci | 1.0 KiB | |
| region | Browse | Structure | Search | Insert | Empty | Drop | | 0 | MyISAM | latin1_swedish_ci | 1.0 KiB | |
| state | Browse | Structure | Search | Insert | Empty | Drop | | 0 | MyISAM | latin1_swedish_ci | 1.0 KiB | |
| webmasters | Browse | Structure | Search | Insert | Empty | Drop | | 0 | MyISAM | latin1_swedish_ci | 1.0 KiB | |
| world | Browse | Structure | Search | Insert | Empty | Drop | | 0 | MyISAM | latin1_swedish_ci | 1.0 KiB | |
| 14 tables | Sum | | | | | | | 0 | MyISAM | latin1_swedish_ci | 15.0 KiB | 0 B |

| # | Column | Type | Collation | Attributes | Null | Default | Extra | Action |
|---|---|---|---|---|---|---|---|---|
| 1 | id | int(11) | | | No | None | AUTO_INCREMENT | ✎ Change ⊘ Drop ▸ More |
| 2 | query | varchar(255) | latin1_swedish_ci | | No | None | | ✎ Change ⊘ Drop ▸ More |
| 3 | query_id | int(99) | | | No | None | | ✎ Change ⊘ Drop ▸ More |
| 4 | url | varchar(255) | latin1_swedish_ci | | No | None | | ✎ Change ⊘ Drop ▸ More |
| 5 | username | varchar(99) | latin1_swedish_ci | | No | None | | ✎ Change ⊘ Drop ▸ More |
| 6 | ip | varchar(99) | latin1_swedish_ci | | No | None | | ✎ Change ⊘ Drop ▸ More |
| 7 | status | int(1) | | | No | None | | ✎ Change ⊘ Drop ▸ More |
| 8 | note | mediumtext | latin1_swedish_ci | | No | None | | ✎ Change ⊘ Drop ▸ More |
| 9 | city | varchar(255) | latin1_swedish_ci | | No | None | | ✎ Change ⊘ Drop ▸ More |
| 10 | region | varchar(255) | latin1_swedish_ci | | No | None | | ✎ Change ⊘ Drop ▸ More |
| 11 | province | varchar(255) | latin1_swedish_ci | | No | None | | ✎ Change ⊘ Drop ▸ More |
| 12 | state | varchar(255) | latin1_swedish_ci | | No | None | | ✎ Change ⊘ Drop ▸ More |
| 13 | country | varchar(255) | latin1_swedish_ci | | No | None | | ✎ Change ⊘ Drop ▸ More |

INTERNET SEARCH ENGINE BASED ON LOCATION AND PUBLIC OPINION

CROSS-REFERENCE TO RELATED APPLICATIONS

This application claims the benefit of priority filing of U.S. provisional patent application No. 61/719,678, filing date Oct. 29, 2012, entitled "Internet Search Engine Based on Location and Public Opinion", which is hereby incorporated by reference in its entirety into the present disclosure.

FIELD OF THE INVENTION

The present invention relates to an internet search engine that is geographic location specific and ranks search results based on public opinion.

BACKGROUND OF THE INVENTION

Internet search engines traditionally use various algorithms to search keywords or combinations of keywords. Advancing technology has resulted in returning better and faster results by optimizing these searching methods.

Despite improved accuracy in search engines, a user may still get erratic or irrelevant results or results that do not appeal to the user.

The present invention searches within the user's immediate geographical location and identifies and ranks the results based on the opinions of fellow users. These search results will be a better fit for the user.

BRIEF DESCRIPTION OF THE DRAWINGS

In order that the invention may be more clearly understood, embodiments thereof will now be described in detail by way of example, with reference to the accompanying drawings, in which:

FIG. 4a is a sample screen shot showing where a user has the option of adding a comment.

FIGS. 9a, 9b, 9c, 9d, 9e, 9f, 9g, 9h, 9i, 9j, 9k, 9l, are sample SQL structures that show how the data is stored on the database.

FIGS. 11a and 11b are, respectively, part 1 and part 2 of an example generic top level domain (gTLD) array.

FIGS. 11c and 11d are sample screen shots showing the option to limit results by gTLD.

FIGS. 12a and 12b are, respectively part 1 and part 2 of an example algorithm for randomizing search results with the same Destiny.

DESCRIPTION OF PREFERRED EMBODIMENTS

The search method according to the present invention is a method that ranks Internet search results based on public opinion and geographical location. When a user performs a search or query, the specific location of the user is determined, such as the country, state or province, region and community of the user. The search looks for ranked results within the various geographical locations. If one or more ranked results exist in the desired locations, the results are displayed starting with the most positive votes, as voted by fellow users, to the least positive votes, followed by the default results, or results that have not been either positively or negatively influenced by users, followed by the least negative votes to the greatest negative votes. The positive and negative votes for a result affect a numeric value, or score, for the result that is referred to, in the present disclosure, as the "Destiny" or "Destiny Score" of the result. If there are one or more results with the same Destiny, above the value of 0.00, those results are randomized to ensure each result has an equal opportunity in the ranking in the search results. Randomization is accomplished by an algorithm, such as the one shown in FIGS. 12a and 12b. If there are no positive or negative results for the user's search, the results will be displayed using a traditional algorithm or algorithms.

Figure 1A:
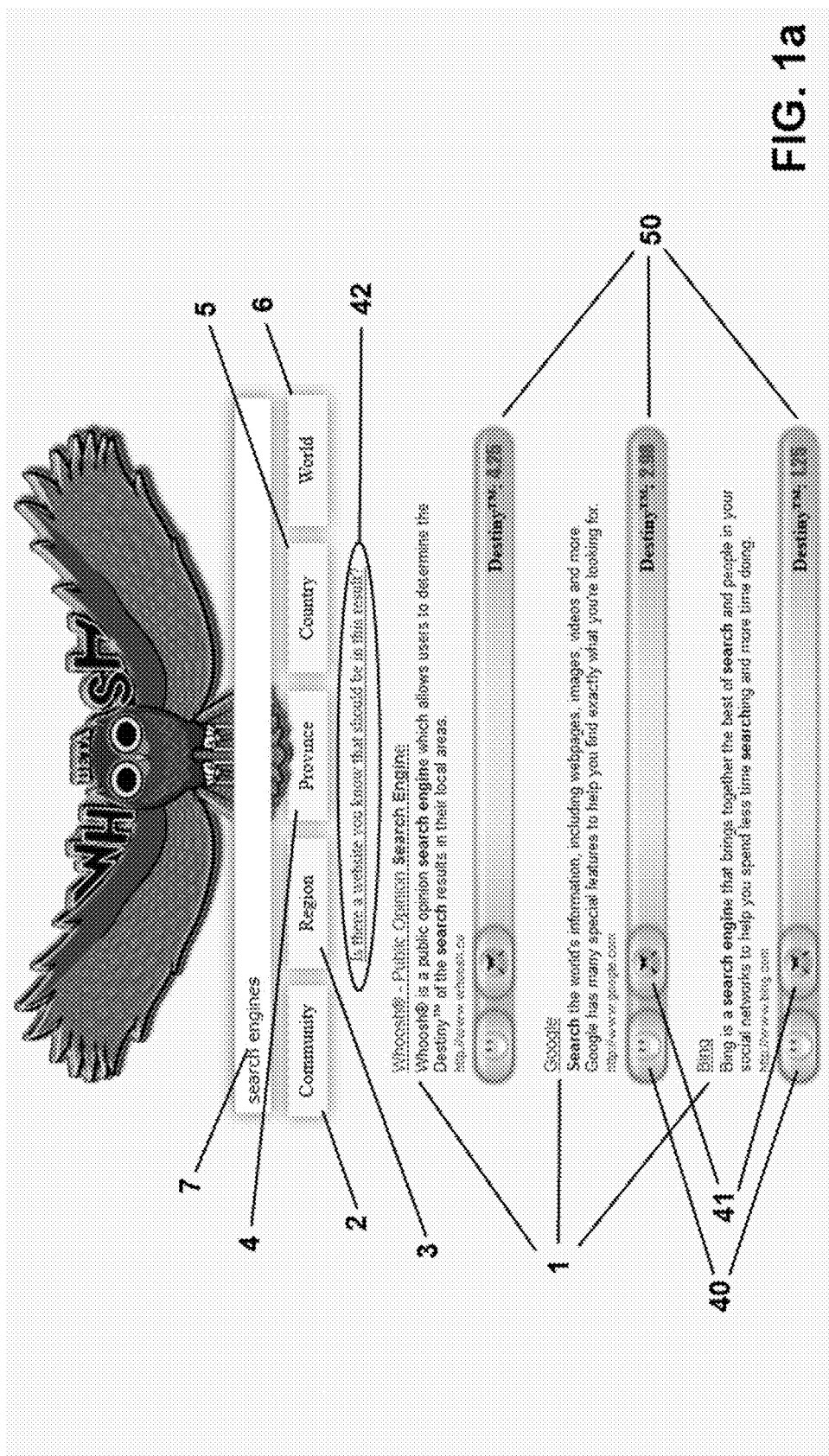
FIG. 1a is a sample screen shot of the search results ranked by public opinion.

As shown in FIG. 1a, a user 10 can choose to display search results 1 by community 2, region 3, province/state 4, country 5 or world 6.

Figure 1B:
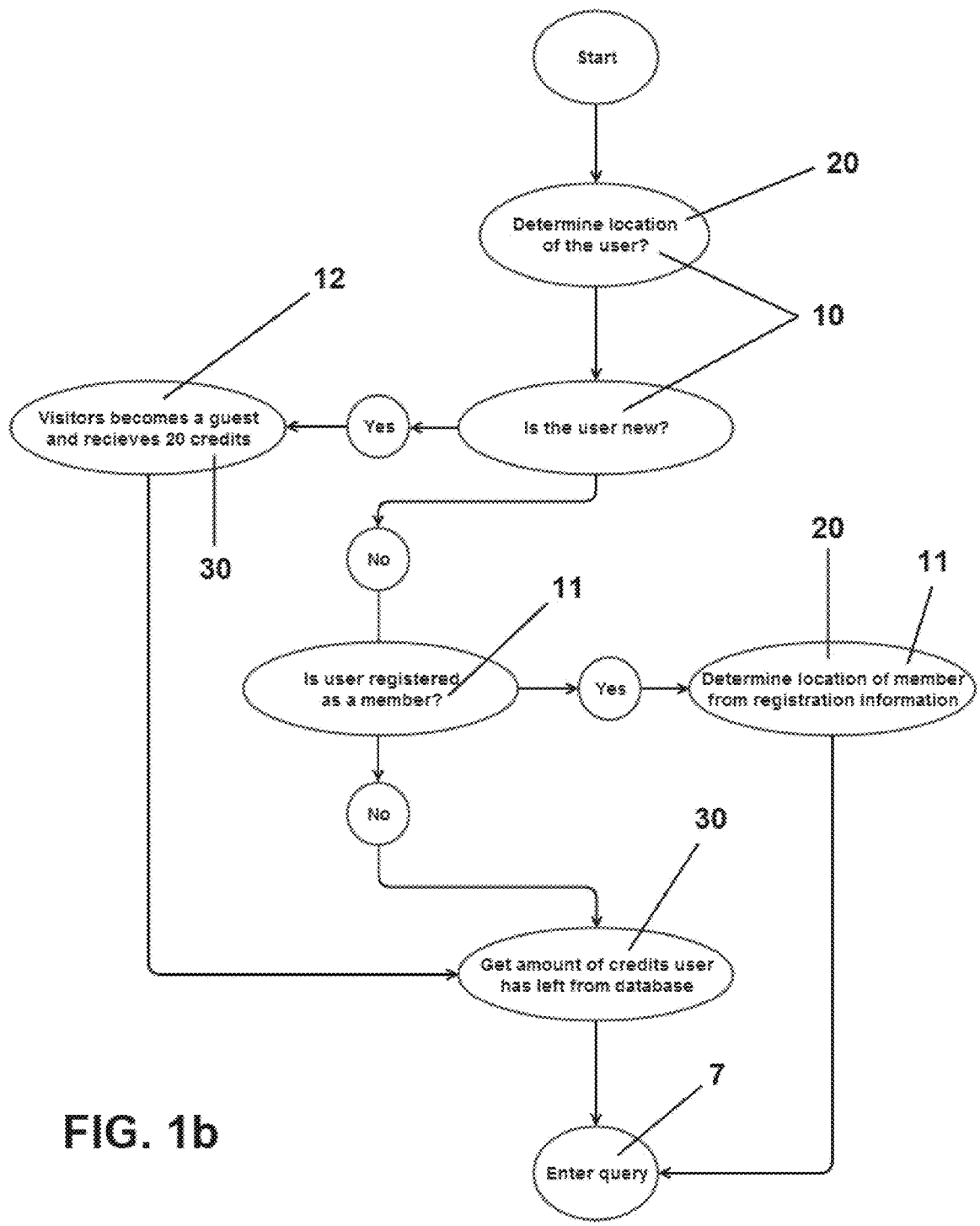
FIG. 1b is a sample flowchart showing the method steps when determining the location of a user.

FIG. 1b is a flowchart to show the method steps used to determine the location 20 of a user. When a user 10 visits the Search homepage, the location 20 of the user is determined through the IP address of the user 10 using a tool such as the MaxMind™ GeoIP™ Databases.

Any user 10 can join and become a member 11 of the website. When joining, the member 11 will give some basic information as well as their desired location 20. When the member 11 logs into their account, their location 20 will already be known.

If the user 10 is not a member 11, they can directly enter a query 7 for the search as a guest 12. Their IP Address is checked in the "guests" SQL Database to determine whether the IP Address already exists. If the user's IP Address is not found in the "guests" table in the database, the user's IP Address will be added to the "guests" table in the database and the guest 12 will be assigned a fixed number of credits 30, preferably 20. Credits 30 are solely used for influencing results, by means of voting. For example, a guest will be limited to voting 20 times for results they either like or dislike.

When all 20 credits are used, the guest 12 will no longer be able to vote for any more results. They must register as a member 11 if they wish to continue influencing the results. If the guest 12 has already visited the site to search and vote, the number of credits 30 remaining for that user 10 will be visibly displayed for the guest 12. The credit system encourages users to become members 11.

Each positive vote 40, from a guest 12 or member 11, for a search result 1 is given a positive value, while each negative vote 41 is given a negative value. Positive votes for a result increase its positive value and its displayed ranking in a results list. Similarly, the more negative votes a result gets, the lower its ranking in a results list. Thus, when a user 10 enters a search, their results list will show what fellow users consider to be the best results for that search by ranking the results based upon the cumulative numerical value, called the score or Destiny Score 50. Search results that have not been voted on, either positively or negatively, will be assigned an arbitrary default score, preferably with a neutral value of 0.

The search results are ranked based upon a user influenced system. When a user 10 enters a query 7, a user search query, the query 7 is checked in a "query_log" table to see if it has already been entered before. This step determines which set of results should be displayed. If the query 7 has been entered before, the id of the query 7, the "query_id", is selected.

If the query 7 has been previously entered, the selected "query_id" and the community 2 of the user are checked in the "community" table to determine whether prior results exist. If results exist, all results containing the "query_id" and the corresponding community 2, having an overall Destiny Score 50 greater than 0.00, are displayed from the greatest positive value to the least positive value, followed by default results that would appear if results were never influenced, followed by results containing the "query_id", the corresponding community 2, having an overall Destiny Score 50 less than 0.00.

After checking the community 2, if there are no prior results in the "community" table for the selected "query_id" and community 2, the "query_id" and the region 3 are checked in the "region" table to determine whether results exist. If results exist, the results will be displayed ranked in the same manner as the community 2 with the most positive to the lease positive, followed by default, and then negative results.

The search then verifies whether the user lives in a country with provinces or states. If the country has provinces, the "query_id" and the province 4 are checked in the "province" table, if the country has states, the "query_id" and the state 4 are checked in the "state" table, and any available results are displayed in the same manner as above.

If there are no prior results in the "province" table or "state" table for the selected "query_id" and province 4 or state 4, the "query_id" and the country 5 are checked in the "country" table to determine whether results exist. If results exist, the results will display in the same manner as above.

Finally, if there are no prior results in the "country" table for the selected "query_id" and country 5, the "query_id" is compared in the "world" table to determine whether results exist. If results exist, the results will be displayed in the same manner as above.

Figure 1C:
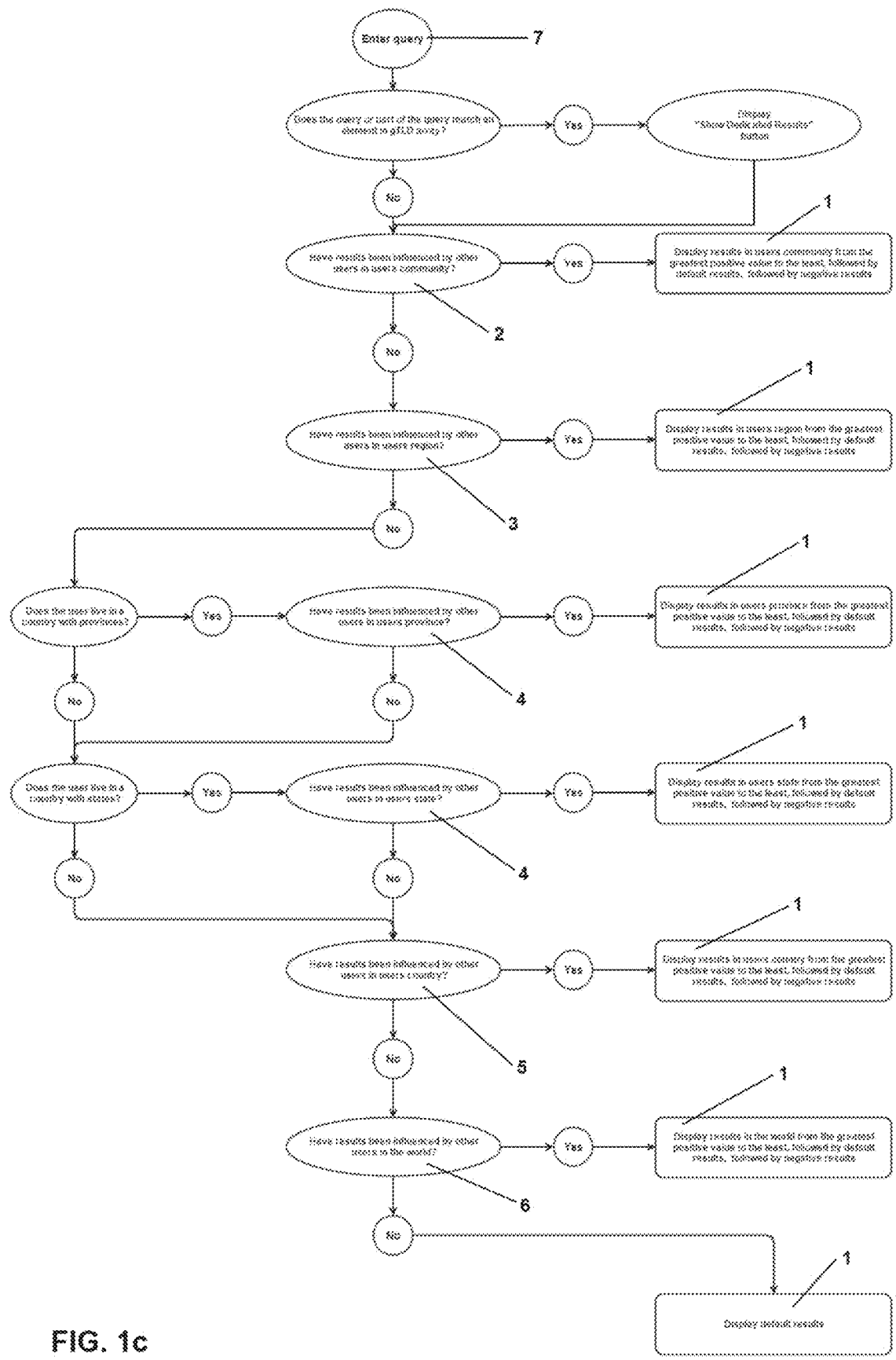
FIG. 1c is a sample flowchart showing the method steps in the local ranking system.

If the query 7 has not been previously entered, a query_id is assigned to the query 7 and stored in the query_log table and default, uninfluenced results are displayed. FIG. 1c is a sample flowchart showing the method steps in the ranking system.

Figure 2A:
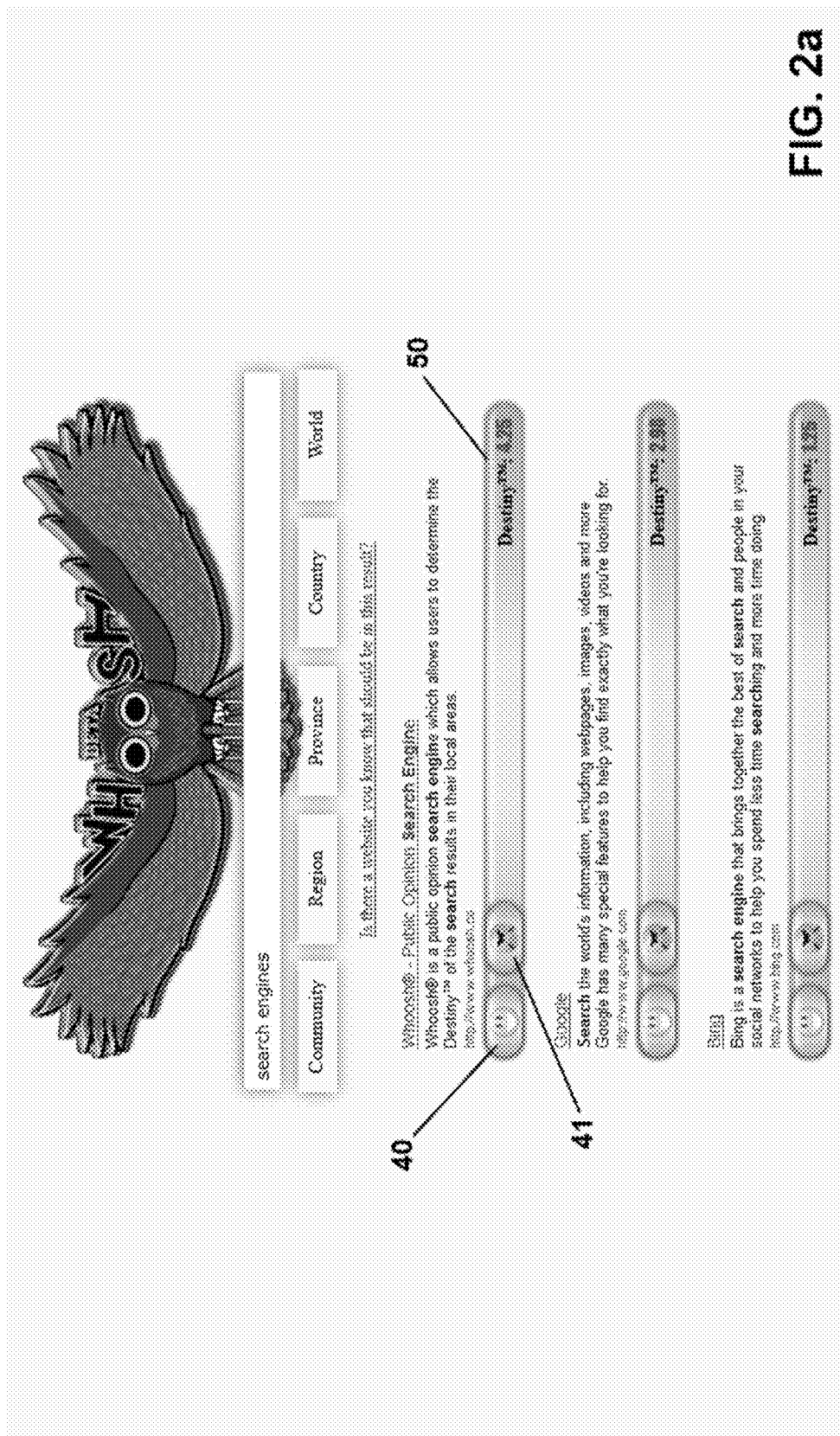
FIG. 2a is a sample screen shot showing voting options.

When the results 1 for a specific search or query 7 are displayed, the user can "influence" or vote on any one result in the user's specific search results list with either a positive vote 40 or a negative vote 41. FIG. 2a shows a sample screen shot showing where a user 10 can click a happy face symbol to give positive feedback or the sad face symbol to give negative feedback.

Figure 2B:
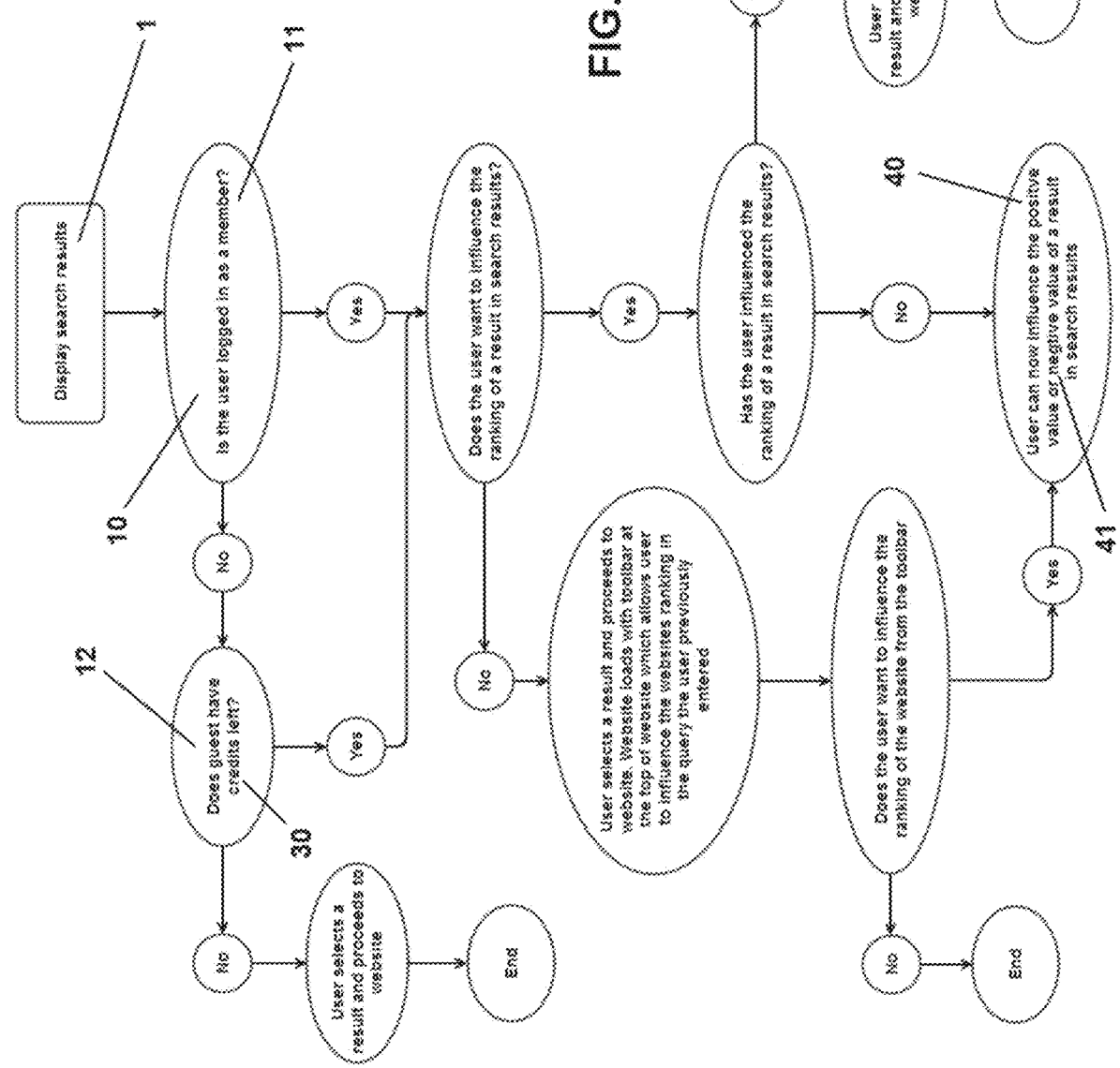
FIG. 2b is a sample flowchart showing the method steps to determine whether a user can influence the search results.

FIG. 2b is a flowchart showing the method steps to determine whether or not a user 10 can influence the search results 1. Preferably, the user 10 can choose whether they wish to influence the ranking of a result in the search query 7 that they entered, if they have not already influenced a result in the query 7. If the user 10 is logged in as a member 11, credits 30 are not needed to vote on a result, as they are for guests. This allows members to influence any one result in as many different queries as they wish.

To determine whether a user 10 has already influenced a result in the query 7, the system checks the "public_opinion_log" table. If the user 10 is a guest 12, the system checks the "query_id" and the "ip" of the user 10. If the "query_id" and the "ip" exist in a row in the table "public_opinion_log", then the user 10 cannot influence the results in this query 7 as they have already done so. If there is no match then the user 10 is allowed to influence the result by voting. If the user 10 is a member 11, the system checks "query_id" and the "username" of the user 10. If the "query_id" and the "username" exist in a row in the table "public_opinion_log" then the user cannot influence the results in this query 7 as they have already done so. If there is no match then the user 10 can influence the result by voting.

If the user 10 is a guest 12 and has no more credits 30 left, they can either register as a member 11 or select a result and proceed to the corresponding website.

The above embodiment of a vote limiting method is preferred, but other methods may be used, such as limiting a user 10 to any other set number of votes per query 7 or in a set time period. A time restriction on repeat voting in a particular query 7 may be used in addition to, or in place of a limit on the number of votes a user 10 is permitted to make in a particular query 7 or set period of time.

If the user 10 has not influenced a result in the query 7 they entered and the user 10 does not want to influence a result, the user selects a result and proceeds to the result's website. The resulting website will load with a toolbar on the top of that website that allows the user 10 to influence the result in the user's query 7 even after leaving the main search homepage. This gives the user 10 a choice whether they wish to influence the result from the website the user 10 is currently on even after leaving the search page.

The search results 1 may be displayed in order from the nearest location 20 to the user 10 if results have been influenced in the search query 7. Otherwise, the uninfluenced search results are displayed, using a traditional algorithm or algorithms.

Figure 11C:
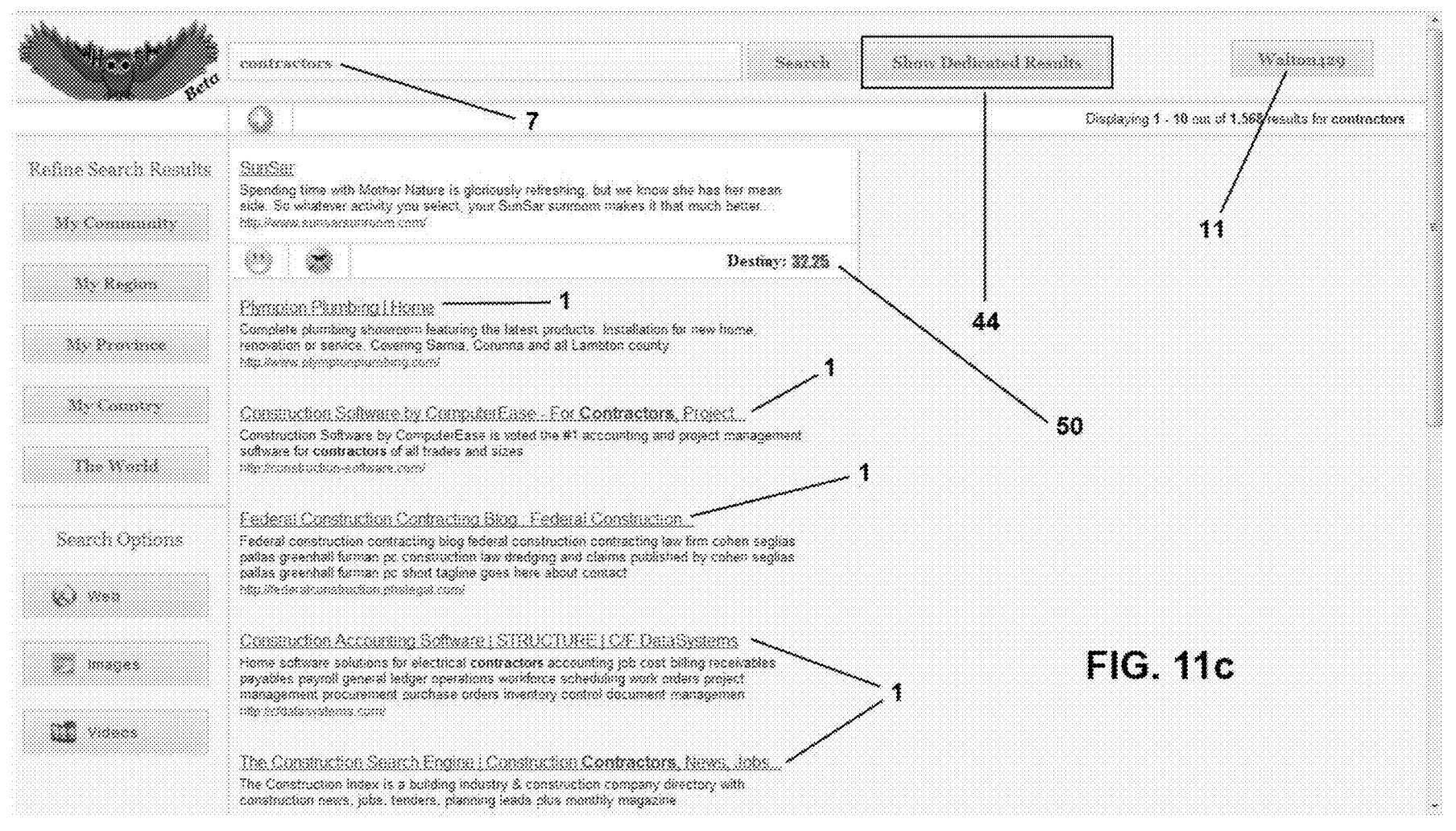
Figure 11D:
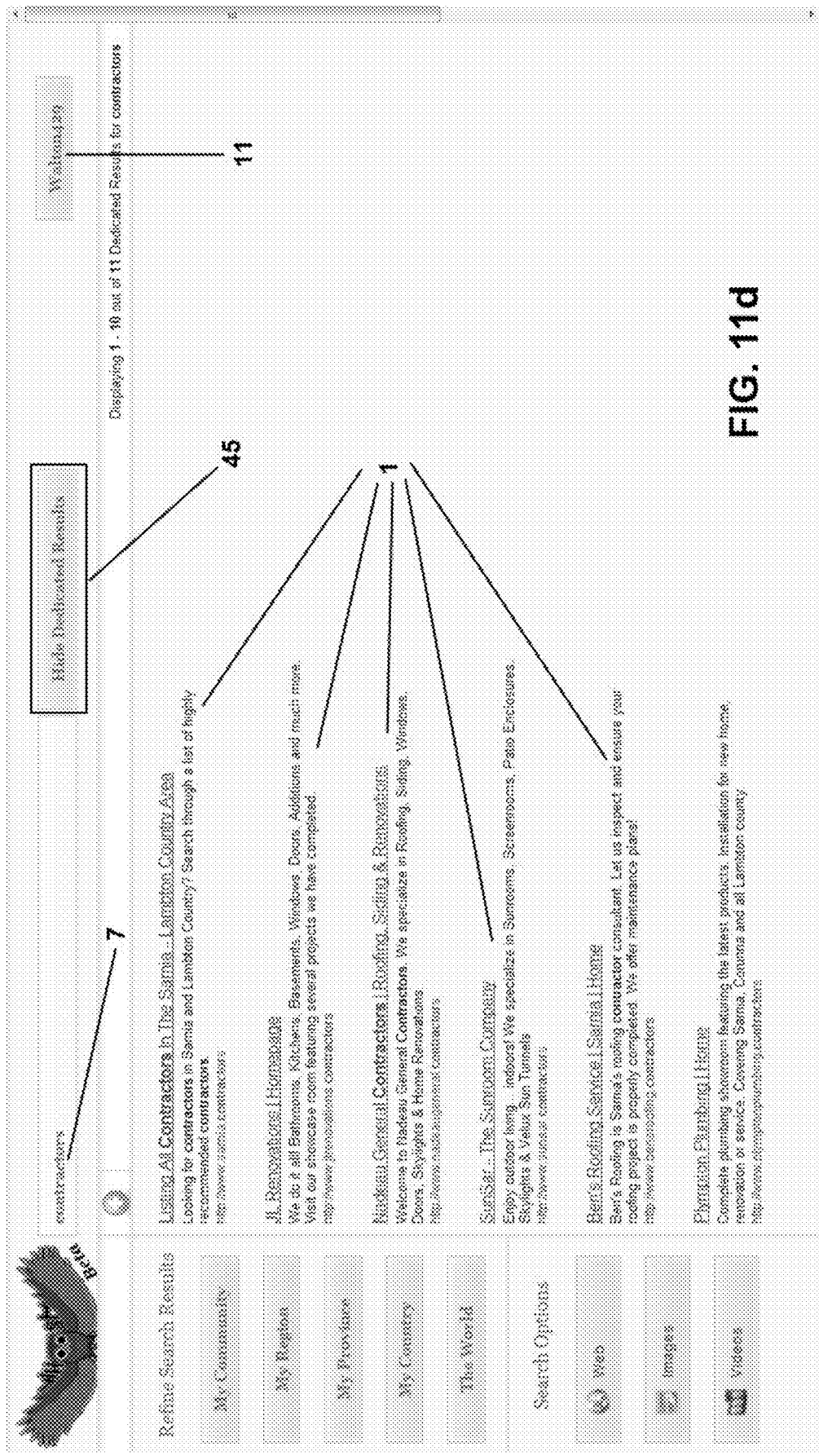

In another embodiment of the present invention, as shown in FIGS. 11c and 11d, search results may be limited by generic top level domain ("gTLD"). The search query 7 is entered by the user, then the system checks if the query 7 or part of the query 7 matches an element in a gTLD array, for example, as shown in FIGS. 11a and 11b. If there is a match an option is displayed to limit the search results by gTLD, for example, as shown in FIG. 11c by displaying the "Show Dedicated Results" button 44.

When a user elects the option to limit the search results by gTLD, such as by clicking the "Show Dedicated Results" button 44, only results with the gTLD matching the query 7 or a piece of the query 7 are displayed. For example, as shown in FIGS. 11c and 11d, if a user enters a search query 7 "contractors", there is a match in the gTLD array and the user clicks the "Show Dedicated Results" button 44, then only domains with the extension "contractors" are displayed in the search results. The user then has the option to deselect the option to limit search results by gTLD, for example, as shown in FIG. 11d by clicking the "Hide Dedicated Results" button 45.

Figure 3A:
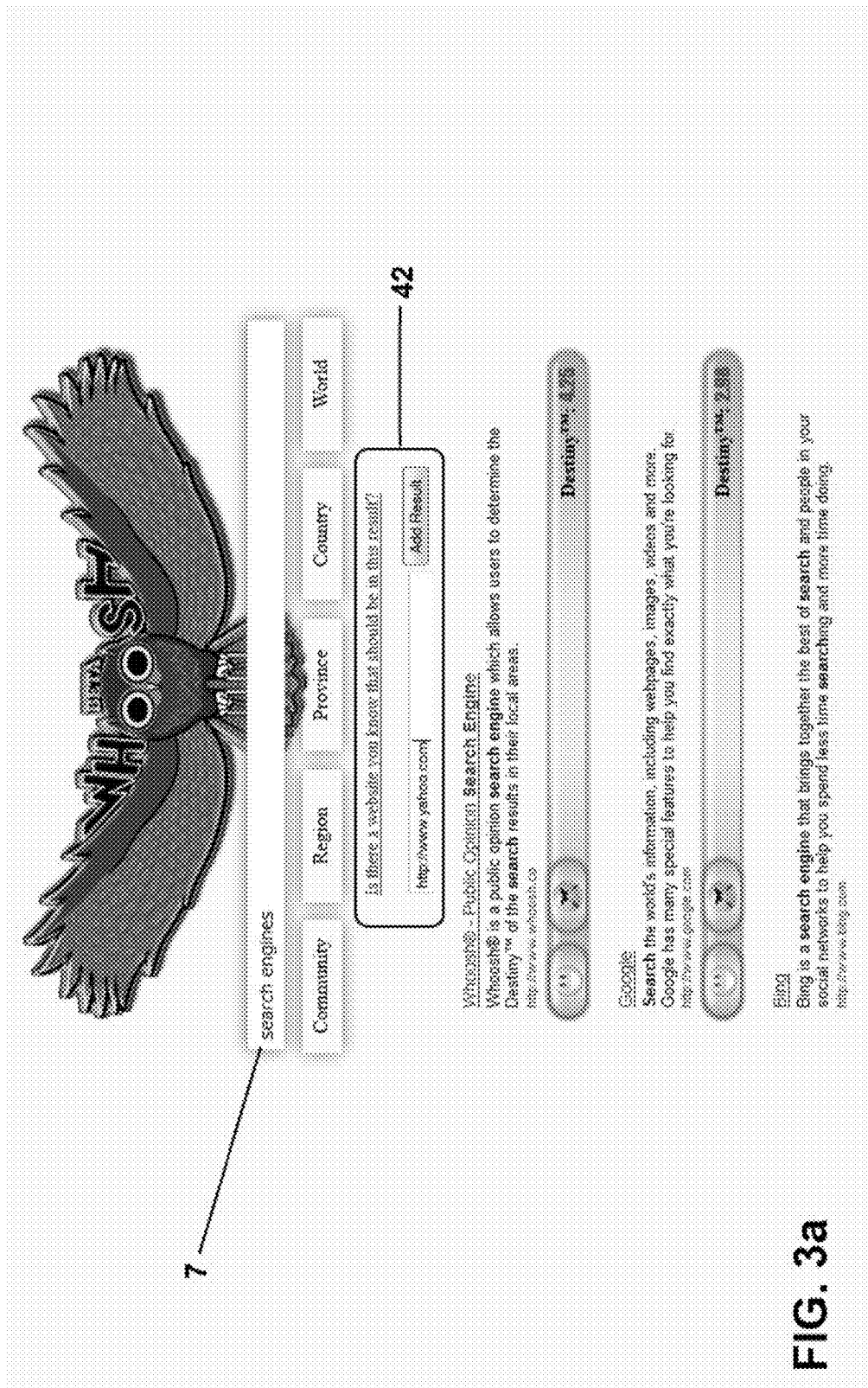
FIG. 3a is a sample screen shot showing where a member can enter a suggestion to the search engine for a particular search or query.

As shown in FIG. 3a, users also have the option of recommending results 42 that they feel should be included. If the user 10 is logged in as a member 11, the "query_id" and the "username" of the member 11 is verified in the "recommended_results" table to determine if the member 11 has previously recommended a result for this query 7. If the member 11 has already recommended a result previously in the same query 7, the member 11 cannot recommend another result in the same query 7. The member 11 can continue to recommend other results, or the same result, in other queries.

Figure 3B:
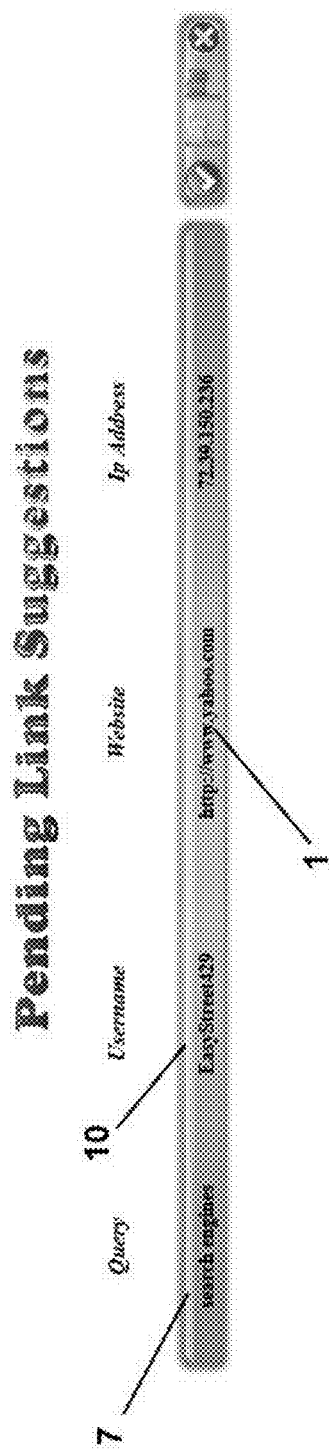
FIG. 3b is a sample screen shot showing where an administrator or moderator can approve or deny suggested results made by members to be included for that particular search or query.

If the member 11 has not recommended a result in this query 7, and the member 11 wants to recommend a result, they can enter the website address or URL. The URL is checked in "recommended_results" table to determine if the result the member 11 is recommending has already been recommended by another member. If the result has already been recommended by another member, the member 11 cannot recommend the result again. If the result has not been previously recommended, the recommended result will be added to the "recommended_results" table pending approval from a moderator and an administrator as shown in FIG. 3b.

Figure 3C:
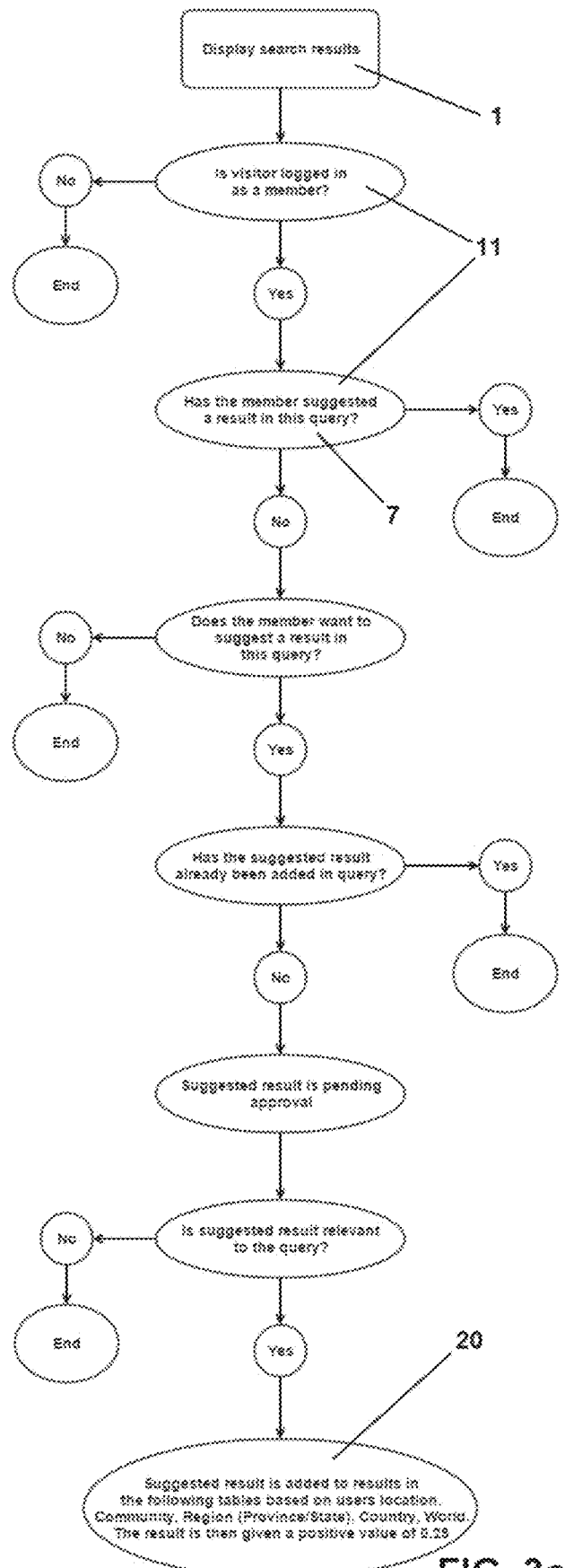
FIG. 3c is a sample flowchart showing the method steps for a member to suggest a new result for a particular search or query.

The moderator or an administrator determines if the recommended result is relevant to the query 7 the result was recommended in. If the result is not relevant to the query 7, the result will be deleted. If the result is relevant to the query 7, the result is automatically assigned a "positive" value and Destiny Score 50 of 0.25. The resulting information is added to the following tables: "community", "region", "province" or "state", "country", and "world" based upon the user's location 20. FIG. 3c is a sample flow chart showing the steps used in the process.

Non-members or guests 12 are given a limited number of "voting" credits. Each user 10 (member 11 or guest 12) is only allowed to vote once per search or query 7 in a specified period of time. This minimizes potential abuse of the voting system. Non-members need to register if they would like more voting opportunities as members can vote as many times as they like in different queries.

Comments 43 may also be left in conjunction with positive or negative votes. FIG. 4a is a sample screen shot showing where a user 10 has the option of adding a comment 43.

Comments 43 also affect the overall Destiny Score 50 or ranking system of the search results 1. If the user 10 chooses to influence the result positively and has chosen not to comment on why they chose to influence the result positively, a value of 1.00 is added to the "positive" value of the result in the set of search results 1 and the overall Destiny Score 50 of the result in this set of search results 1.

If the user 10 chooses to influence the result negatively and has chosen not to comment on why they choose to influence the result negatively, a value of 0.05 is added to the "negative" value of the result in the set of search results 1 and 0.05 is subtracted from the overall Destiny Score 50 of the result in this set of search results 1.

If the user 10 chooses to leave a comment 43 for a positive result, the comment 43 will be filtered to delete any inappropriate words using a filter tool. The characters remaining from the comment 43 are counted. For example, "This is a comment" would have a character count of 14. The sum of the character count is multiplied by a pre-set value, and in this example, 14*0.000976563=~0.014. A value of 1.00 is added to the 0.014 and that new value, 1.014 gets added to the "positive" value of the result in this set of search results 1 and the overall Destiny Score 50 of the result in this set of search results 1. If a member 11 leaves an extremely long comment 43 and the character count exceeds 1024, the maximum positive value added by a comment 43 is limited to no more than 1.00.

If the user 10 chooses to leave a comment 43 for a negative result, the calculations are slightly different. For example, a value of 0 is added to the 0.014 and that is added to the "negative" value of the result in this set of search results 1 and 0+(0.014) gets subtracted from the overall Destiny Score 50 of the result in this set of search results 1.

Figure 4B:
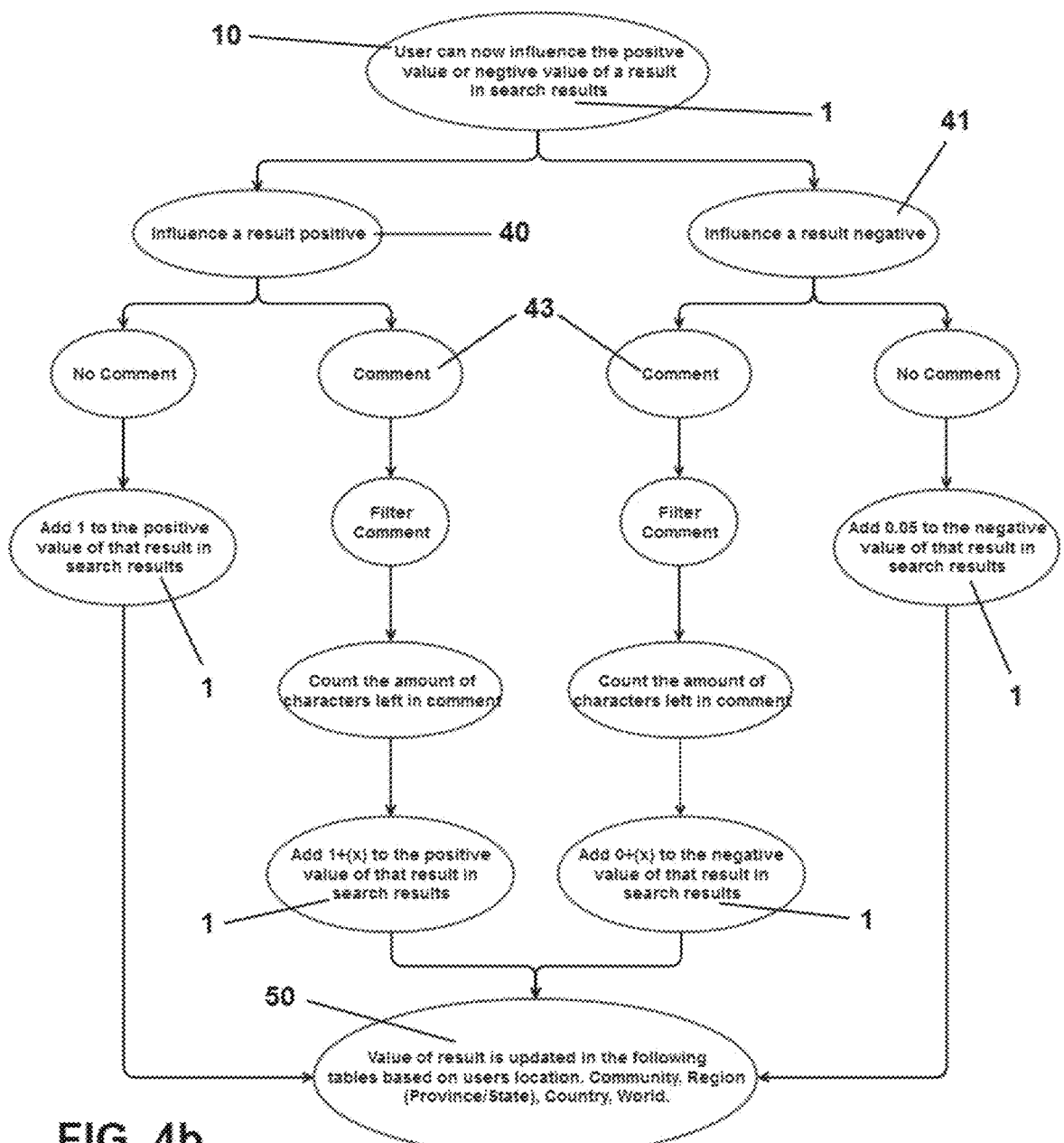
FIG. 4b is a flowchart showing the method steps involved in calculating the ranking score.

The result is updated or added in the following tables ("community", "region", "province" or "state", "country", and "world") along with the "positive", "negative" and overall Destiny Score 50 of the result. FIG. 4b is a flowchart showing the method steps involved in calculating the ranking score.

Figure 5:
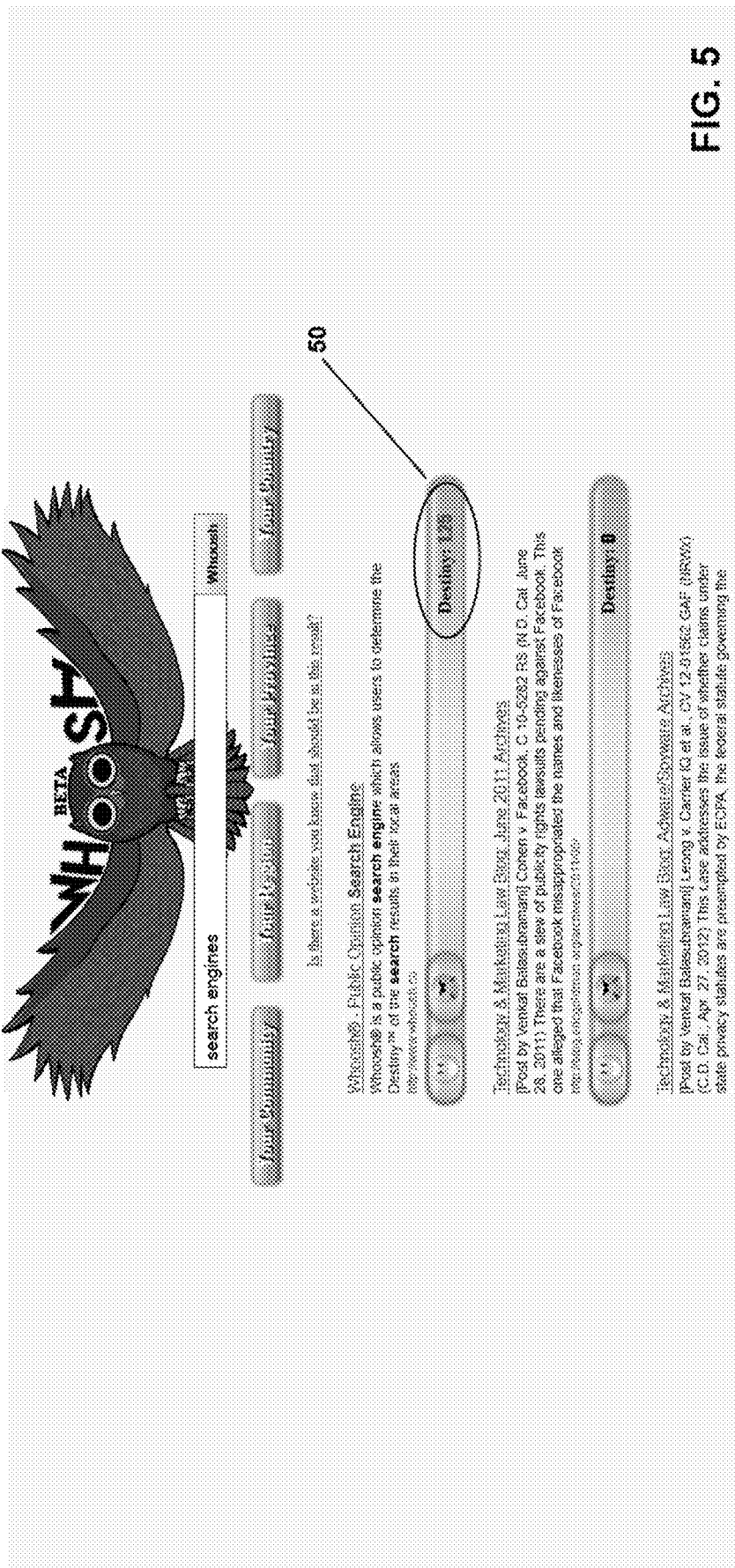
FIG. 5 is a sample screen shot showing the Destiny score.
Figure 6:
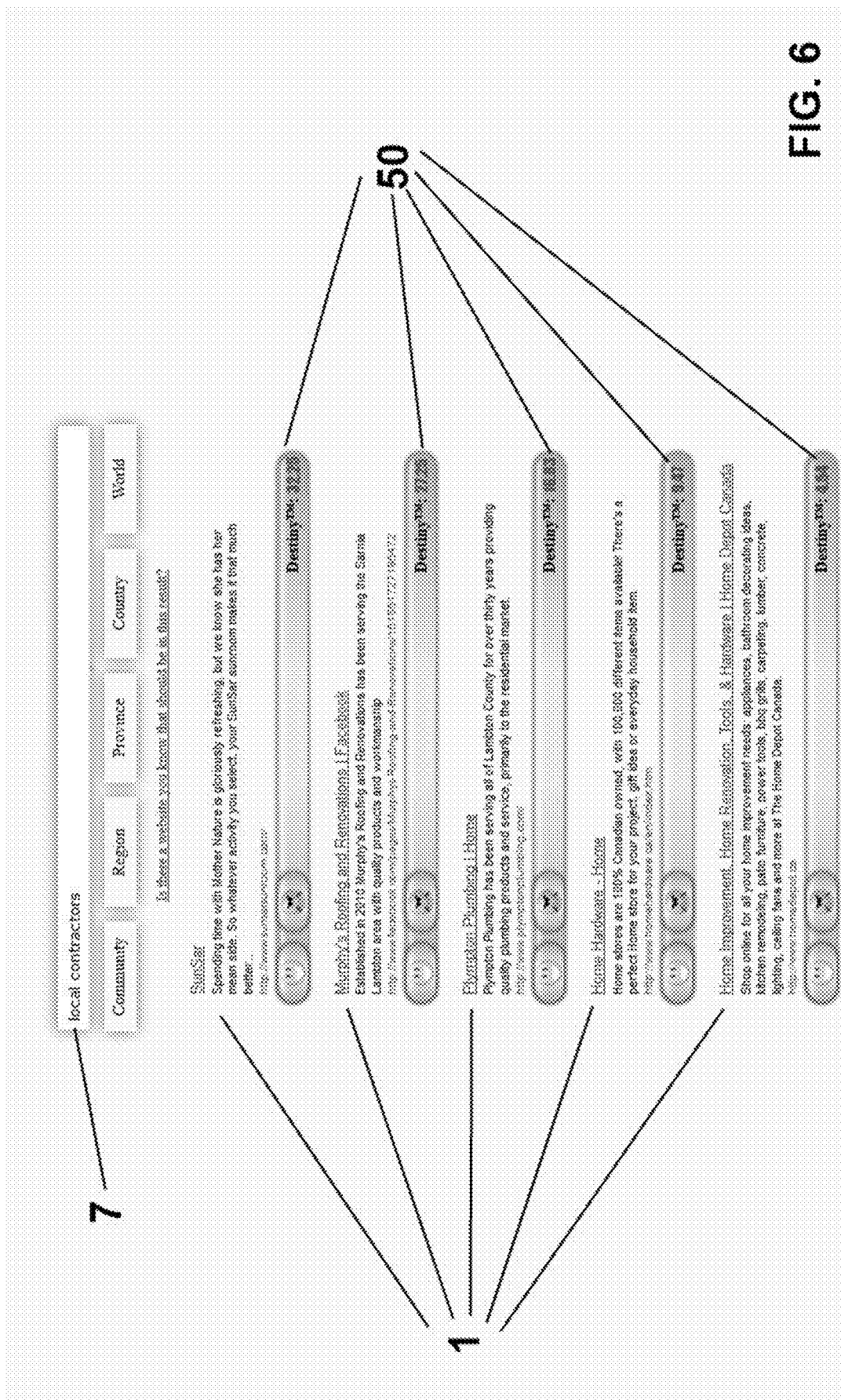
FIG. 6 is a sample screen shot showing the ranking of results by their Destiny Scores.

FIG. 5 is a sample screen shot showing an overall Destiny Score 50 of 1.25. FIG. 6 shows the results ranked according to the overall Destiny Score 50. When members suggest a website that is not in the search results, once approved, a positive value of 0.25 is added to the overall Destiny Score 50 of the result. This gives the added result an initial positive overall Destiny Score 50 in the results, since it has been recommended by a member. From there fellow users can influence the overall Destiny Score 50 of that recommended result, as described above.

Figure 7:
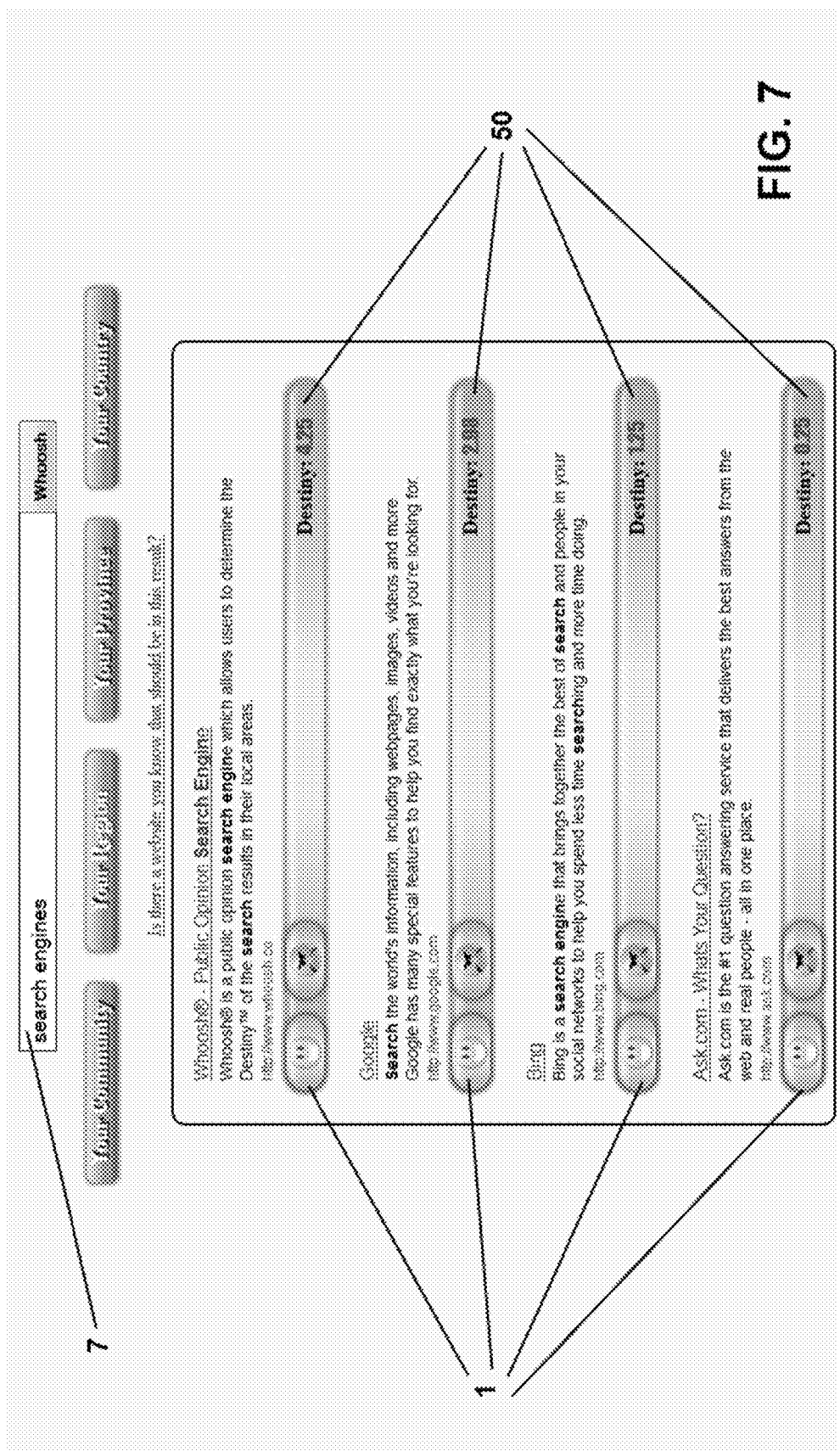
FIG. 7 is a sample screen shot showing search results narrowed by specificity.

The user 10 has the ability to switch which set of results are displayed in the user's query 7. That is, the results can be displayed at the community 2, region 3, province 4 (or state 4), country 5 or world 6 levels. As shown in FIG. 7, the results can also be narrowed by specificity, such as for example, local contractors. Users can also choose to change the order in which the results 1 are displayed, such as for example, instead of positive results followed by neutral results followed by negative results, users can change this to positive results, negative results, then neutral, or any combination thereof.

Figure 10A:
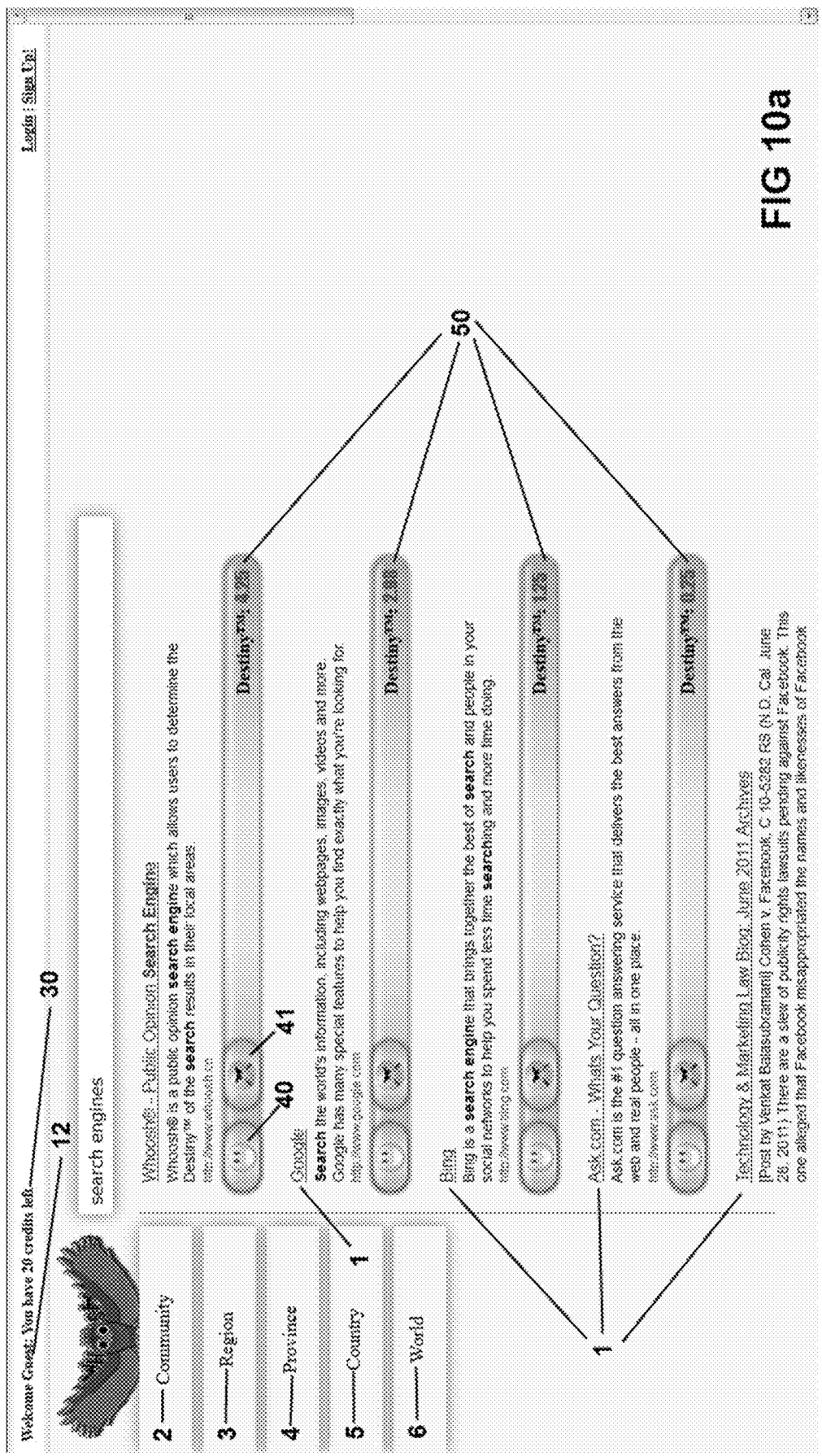
FIG. 10a is a sample screen shot showing an example of a page layout style option with the results displayed on the left hand side of the page.
Figure 10B:
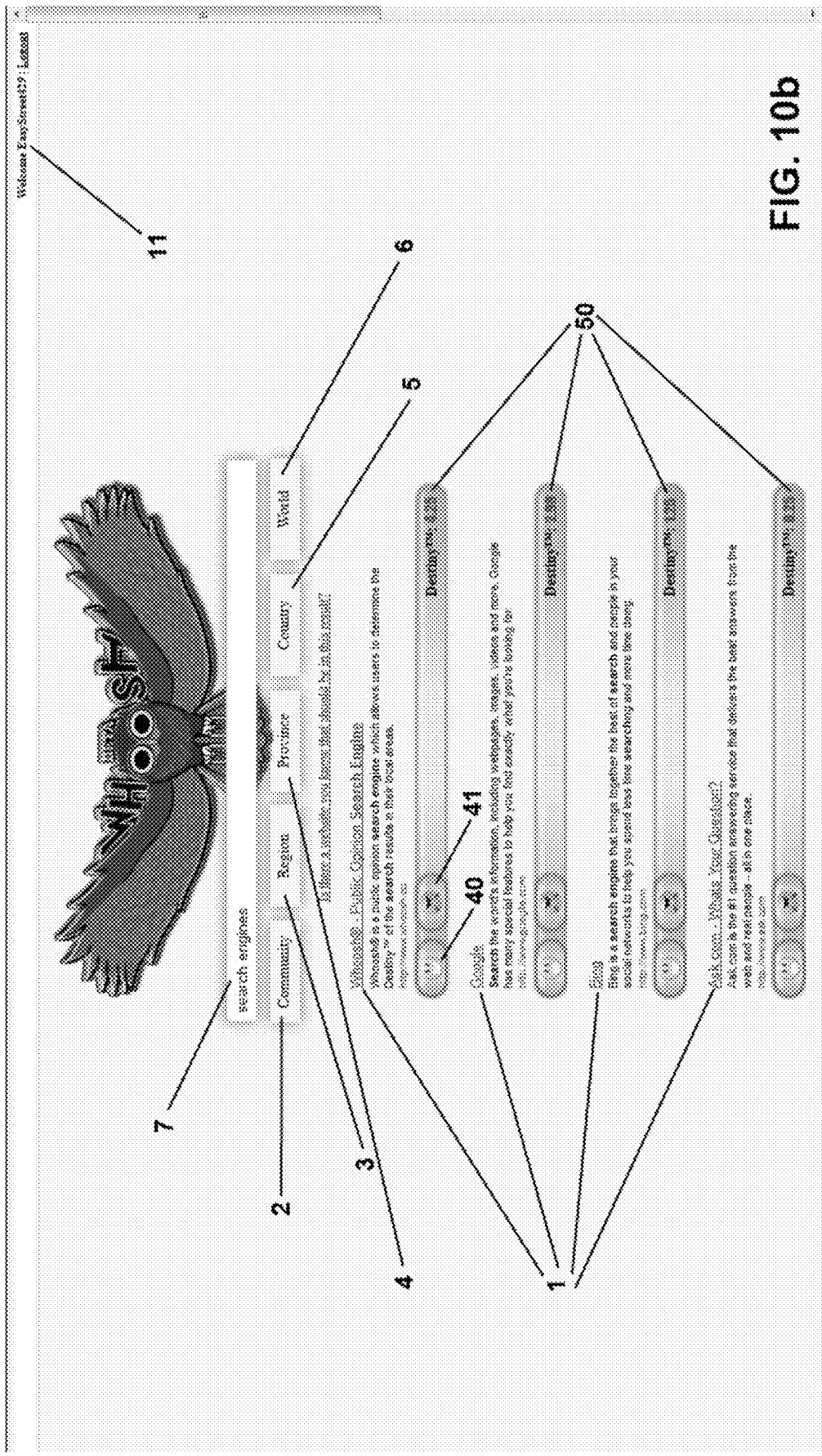
FIG. 10b is a sample screen shot showing an example of a page layout style option with the results displayed in the centre of the page.

The user 10 can switch the page layout style of how the search results 1 are displayed, such as for example, with all the results on the left side of the page as shown in FIG. 10a, or with the results in the centre of the page as shown in FIG. 10b. If the user 10 is a guest 12, different page layouts are randomized every time the guest 12 enters a query 7 until the guest 12 sets a temporary preference to keep the layout a certain way. Members can store their preference.

Each and every single result has an information page which displays information such as: the webmaster of the website; all the comments users have posted about the result; the results total "positive" and "negative" values; other guests/members who influenced the values of the result (positive or negative). Every result contains full details.

Figure 8A:
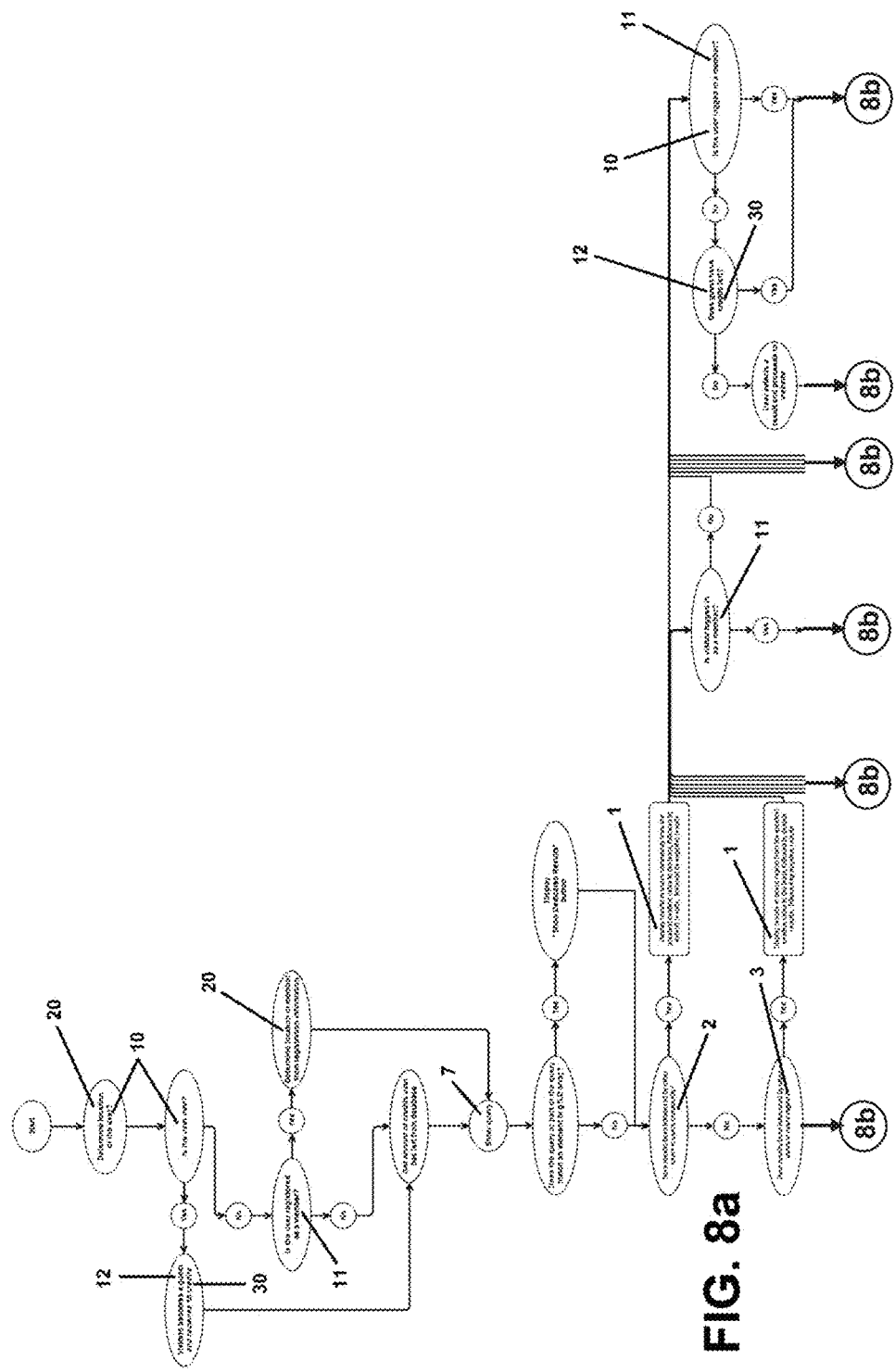
FIGS. 8a and 8b together are an overall flow chart showing the method steps of the present invention.
Figure 8B:
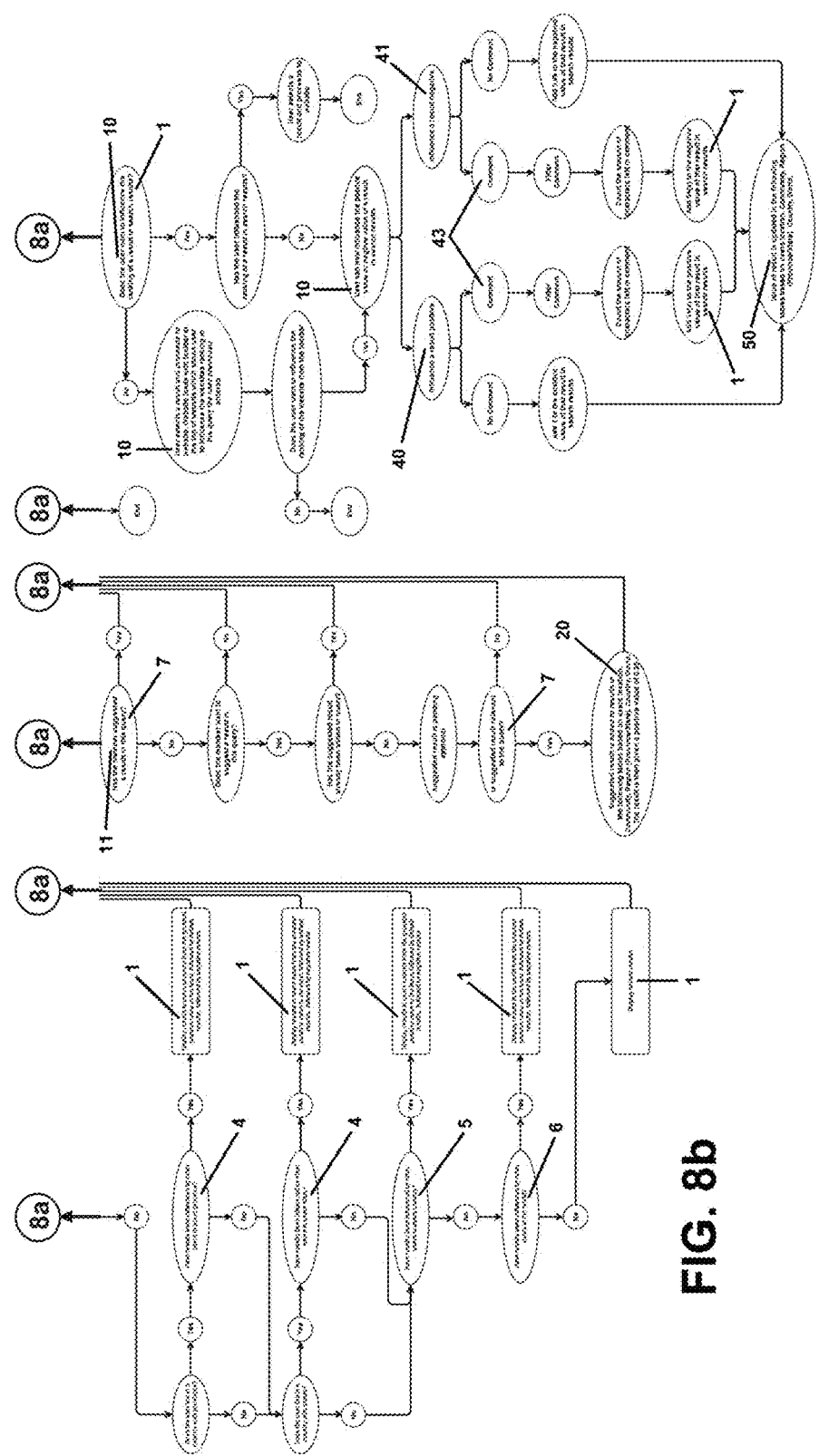
Figure 9A:
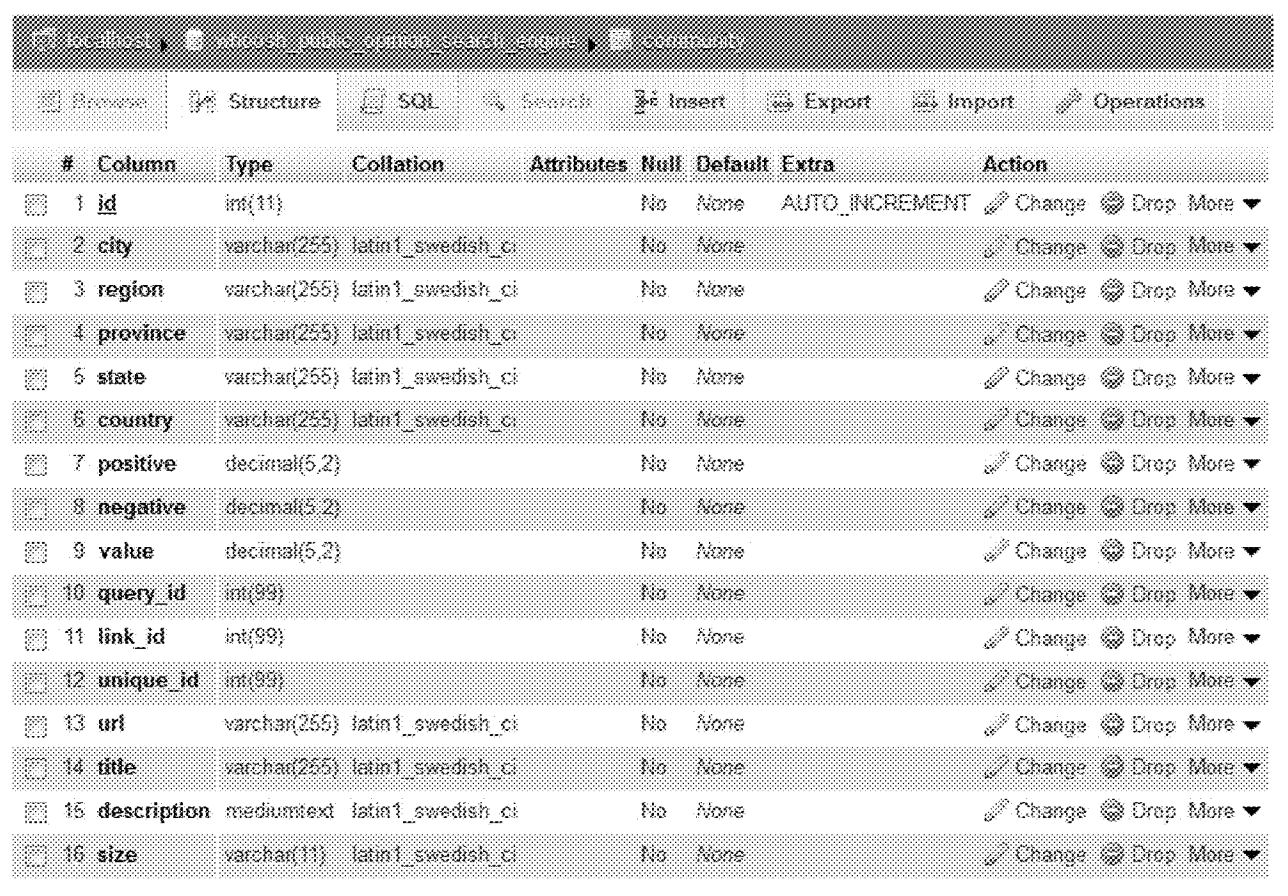
Figure 9B:
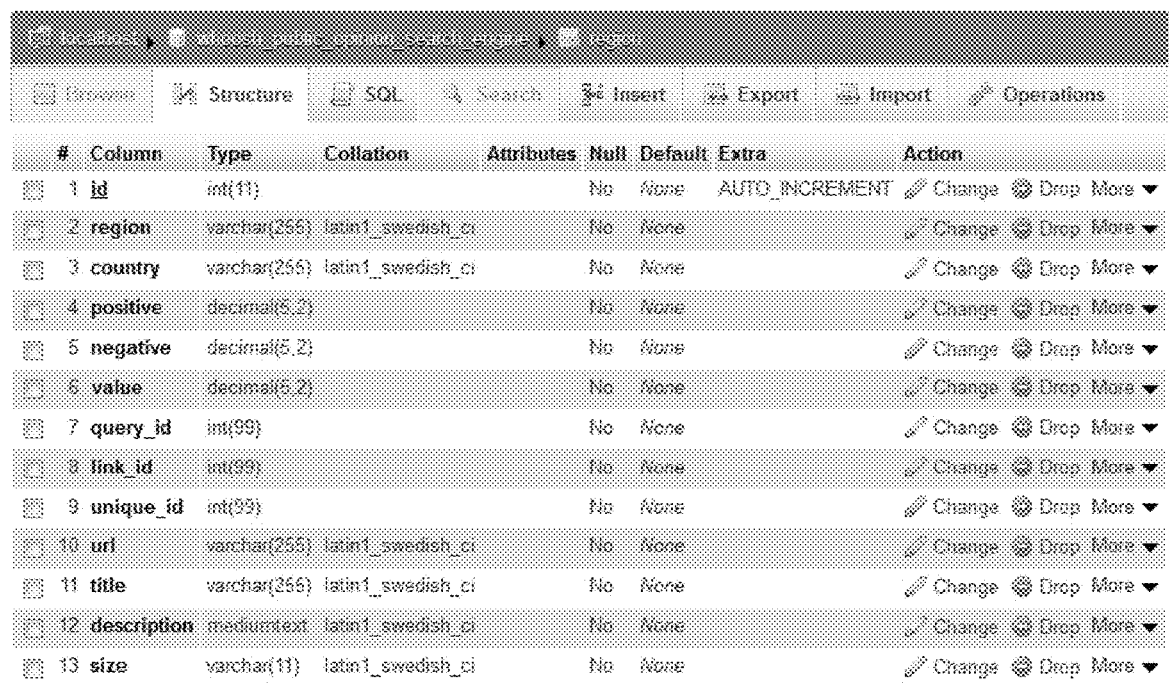
Figure 9C:
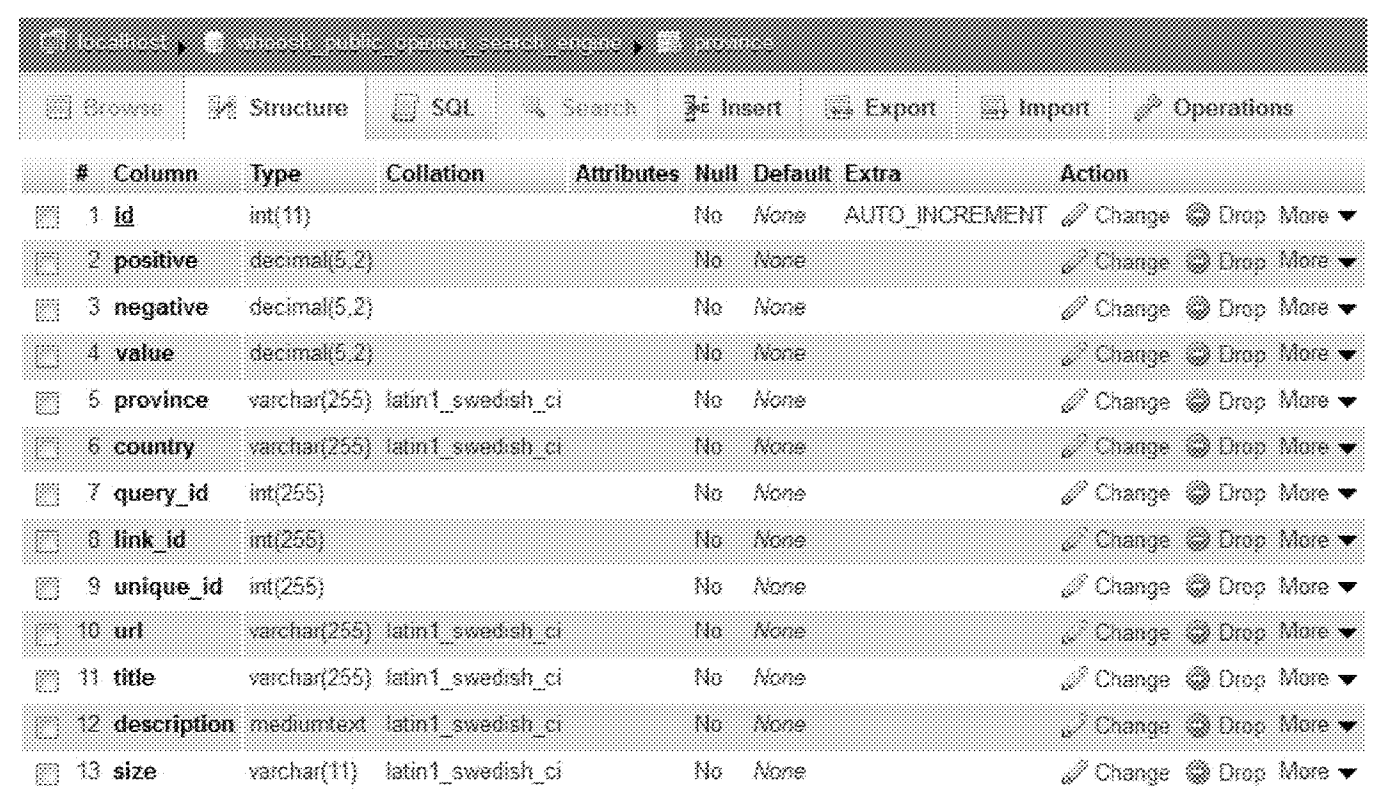
Figure 9G:
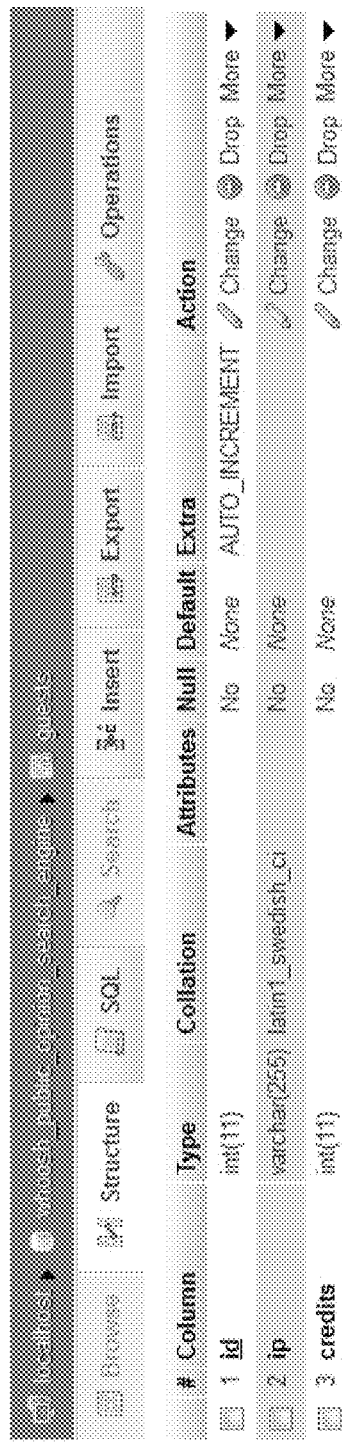
Figure 9I:
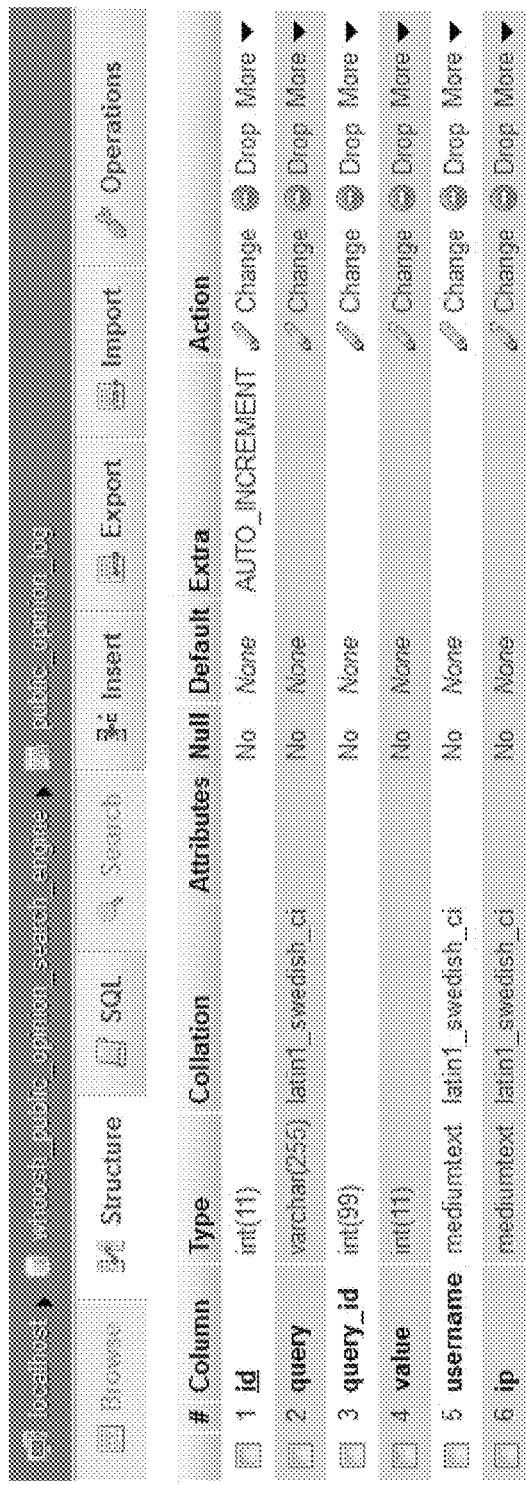
Figure 9J:
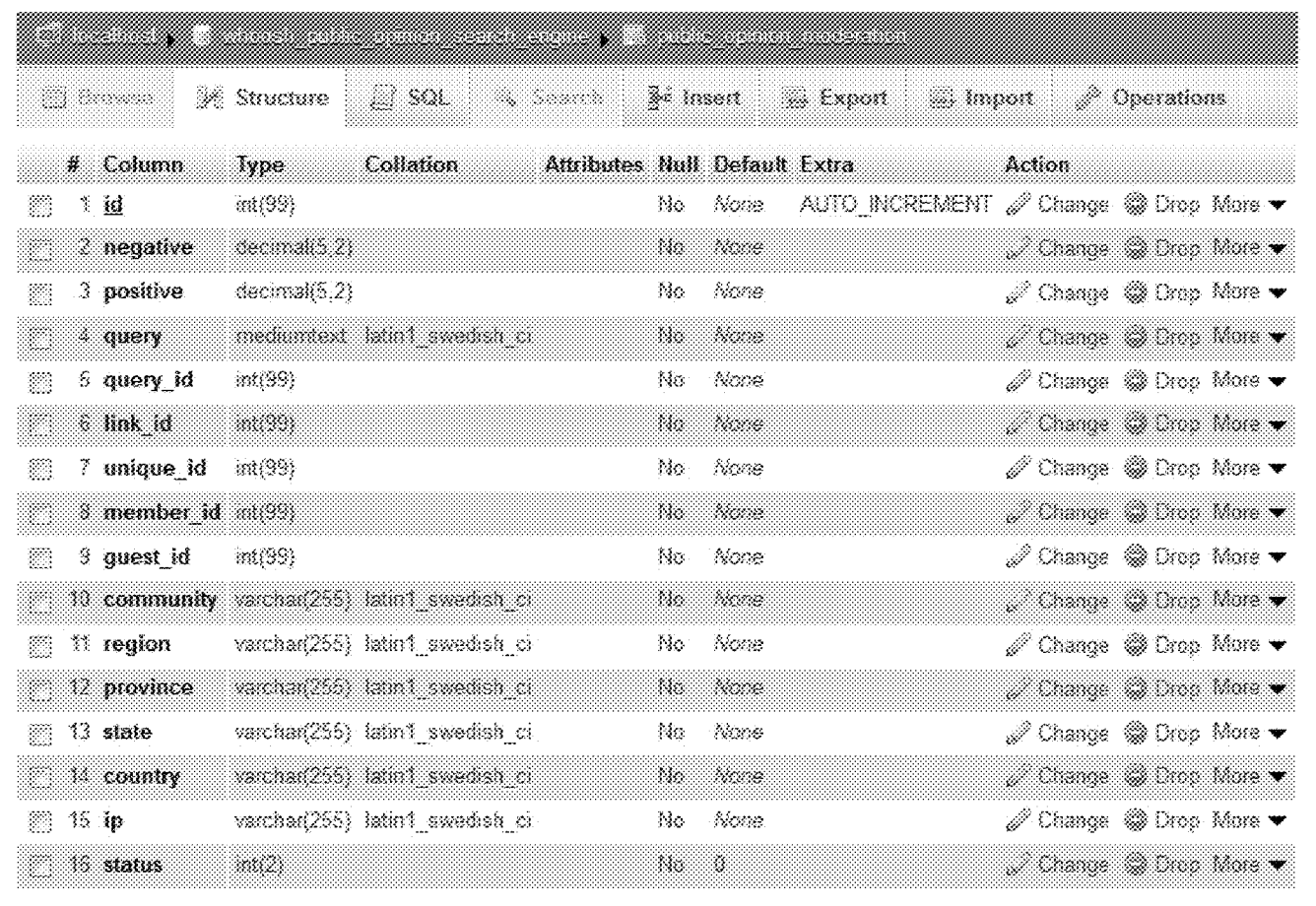
Figure 9K:
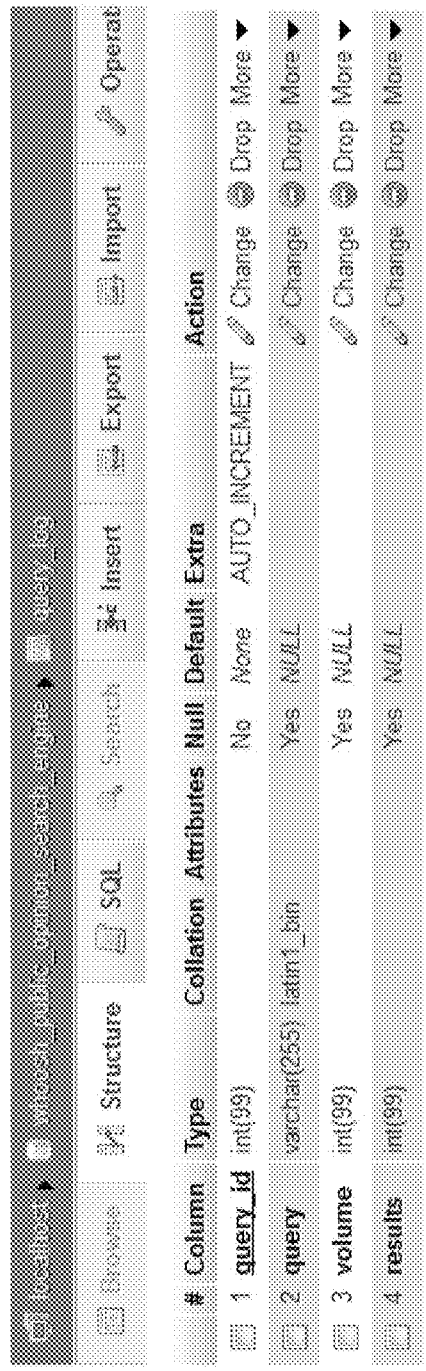

FIGS. 8a and 8b is an overall flow chart showing the method steps of the present invention. FIGS. 9a to 9l are sample SQL structures that show how the data is stored on the database.

Further advantages which are inherent to the invention are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the claims.

What is claimed is:

1. A computer-implemented method of ranking internet search results generated by a search engine, comprising the steps of:
   receiving, by one or more computing devices, a user search query from a user;
   generating, by the one or more computing devices, internet search results for said user search query;
   determining, by the one or more computing devices, the geographic location of said user;
   identifying, by the one or more computing devices, any of said internet search results that have a score for said user search query and said geographic location, wherein said score consists of:
      a cumulative numerical value for a particular search result linked to a particular search query and a particular geographic location, calculated based on feedback from users, wherein said feedback comprises a user's positive or negative vote on said particular internet search result, which is stored and used for ranking subsequent internet search results displayed in response to subsequent search queries;
   identifying, by one or more computing devices, any of said internet search results that do not have a score and assigning an arbitrary default score to any such internet search results;
   ranking, by the one or more computing devices, said internet search results according to said scores, starting with the highest numerical value, continuing by descending numerical value and ending with the lowest numerical value;
   displaying, by the one or more computing devices, at least a subset of said internet search results, starting with the highest ranked, continuing by descending rank and ending with the lowest ranked;
   displaying, by the one or more computing devices, a feedback request regarding one or more of said internet search results, wherein said feedback request comprises an option to positively or negatively vote on said one or more of said internet search results;
   optionally receiving, by the one or more computing devices, feedback from said user regarding said one or more of said internet search results for said user search query and said geographic location;
   modifying, by the one or more computing devices, said score for each of said one or more of said internet search results for said user search query and said geographic location, for which said feedback is received from said user; and
   storing, by the one or more computing devices, said score for each of said one or more of said internet search results for said user search query and said geographic location, to be used for ranking internet search results in response to subsequent search queries.

2. The method of claim 1, wherein said geographic location is determined at a plurality of variously geographically specific levels.

3. The method of claim 2, wherein said plurality of variously geographically specific levels comprises a global level, a country level, a province or state level, a region level and a community level.

4. The method of claim 2, wherein said internet search results that have a score are identified for said geographic location at the most geographically specific level in which any such score exist.

5. The method of claim 1, further comprising the steps of:
   checking, by the one or more computing devices, if said user search query or a part of said search search query matches an element in a generic top level domain array;
   if said user search query or a part of said user search query matches an element in said generic top level domain array, displaying, by the one or more computing devices, an option to limit search results by generic top level domain;
   receiving, by the one or more computing devices, a selection of said option to limit search results from said user;
   displaying, by the one or more computing devices, at least a subset of said internet search results, starting with the most positively ranked, continuing by descending rank and ending with the most negatively ranked, limited to only domains matching said element;
   displaying, by the one or more computing devices, an option to remove the limitation of search results by generic top level domain;
   receiving, by the one or more computing devices, a selection of said option to remove the limitation from said user; and
   displaying, by the one or more computing devices, said internet search results, starting with the most positively ranked, continuing by descending rank and ending with the most negatively ranked.

6. The method of claim 1, wherein:
   the step of displaying, by the one or more computing devices, a feedback request regarding one or more of said internet search results comprises displaying, by the one or more computing devices, a feedback request regarding a particular internet search result of said internet search results; and
   the step of receiving, by the one or more computing devices, feedback from said user regarding said one or more of said internet search results comprises receiving, by the one or more computing devices, feedback from said user regarding said particular internet search result.

7. The method of claim 6, further comprising the step of receiving, by the one or more computing devices, a plurality of feedback from the user in response to a plurality of feedback requests corresponding to a plurality of particular internet search results.

8. The method of claim 1, wherein said user is only permitted to provide feedback for a set number of said internet search results for a particular search query.

9. The method of claim 1, wherein said user is only permitted to provide feedback for a set number of said internet search results within a set time period for a particular search query.

10. The method of claim 1, further comprising the steps of:
   displaying, by the one or more computing devices, a suggested result request for said user search query;
   receiving, by the one or more computing devices, a suggested result for said user search query from said user;
   adding, by the one or more computing devices, said suggested result to said search results for said user search query; and assigning, by the one or more computing devices, an arbitrary default score corresponding to said suggested result for said search query and said geographic location.

11. The method of claim 10, further comprising the steps of:
reviewing, by the one or more computing devices, said suggested result; and
approving or rejecting, by the one or more computing devices, said suggested result prior to adding, by the one or more computing devices, said suggested result to said search results for said search query and said geographic location.

12. The method of claim 11, wherein said arbitrary default score is a positive numerical value.

13. The method of claim 1, wherein:
said feedback request further comprises the option to leave a comment on said one or more of said internet search results; and
said feedback optionally further comprises a comment on said one or more of said internet search results.

14. The method of claim 13, wherein the amount by which said score is modified varies based on the length of any comment received from said user as part of said feedback.

* * * * *